(12) United States Patent
Johananoff

(10) Patent No.: US 11,975,597 B2
(45) Date of Patent: *May 7, 2024

(54) VEHICLE ACCESSORY DEVICE AND SYSTEM

(71) Applicant: Smart Additions, Inc., Central Valley, NY (US)

(72) Inventor: Daniel Johananoff, Sloatsburg, NY (US)

(73) Assignee: Smart Additions, Inc., Central Valley, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/070,756

(22) Filed: Nov. 29, 2022

(65) Prior Publication Data

US 2023/0092114 A1    Mar. 23, 2023

Related U.S. Application Data

(63) Continuation of application No. 17/225,036, filed on Apr. 7, 2021, now Pat. No. 11,511,604.

(51) Int. Cl.
*B60J 3/02* (2006.01)
*B60R 1/04* (2006.01)
*B60R 11/02* (2006.01)
*B60R 11/04* (2006.01)
*B60R 11/00* (2006.01)

(52) U.S. Cl.
CPC .......... *B60J 3/0208* (2013.01); *B60J 3/0252* (2013.01); *B60J 3/0265* (2013.01); *B60R 1/04* (2013.01); *B60R 11/0235* (2013.01); *B60R 11/04* (2013.01); *B60R 2011/0035* (2013.01)

(58) Field of Classification Search
CPC ......... B60J 3/0208; B60J 3/0265; B60R 1/04; B60R 11/0235; B60R 11/04
USPC ...................................................... 296/97.5
See application file for complete search history.

(56) References Cited

U.S. PATENT DOCUMENTS

| | | |
|---|---|---|
| 1,965,839 A | 7/1934 | Holt |
| 2,064,746 A | 12/1936 | Hawk |
| 2,167,962 A | 8/1939 | Sovis |

(Continued)

FOREIGN PATENT DOCUMENTS

KR    20040071012 A    8/2004

OTHER PUBLICATIONS

International Search Report and Written Opinion dated Sep. 7, 2018 cited in Application No. PCT/US2018/034965, 13 pgs.

(Continued)

*Primary Examiner* — Joseph D. Pape
(74) *Attorney, Agent, or Firm* — BEKIARES ELIEZER LLP

(57) ABSTRACT

Disclosed herein are accessory devices and systems for vehicles including: a base plate assembly comprising a base plate and an articulating bracket, the base plate configured to be fixedly secured to a portion of a vehicle and the articulating bracket configured to be releasably secured to the vehicle using the base plate at a plurality of locations; and at least one auxiliary visor panel or accessory connected to the base plate assembly. Also disclosed herein are method of using the disclosed devices and systems for interchangeably moving the base plate assembly with connected auxiliary visor panel or accessory between vehicles.

20 Claims, 24 Drawing Sheets

(56) References Cited

U.S. PATENT DOCUMENTS

| | | | |
|---|---|---|---|
| 2,542,409 A | 2/1951 | Guenther | |
| 3,825,296 A | 7/1974 | Peterson | |
| 3,954,297 A | 5/1976 | Linke et al. | |
| 4,053,180 A | 10/1977 | White | |
| 4,486,819 A | 12/1984 | Marcus et al. | |
| 4,690,450 A * | 9/1987 | Boerema | B60J 3/0208 296/97.9 |
| D298,427 S | 11/1988 | Jönsas | |
| 4,913,483 A | 4/1990 | Jasso | |
| 4,989,910 A | 2/1991 | Mersman et al. | |
| 5,213,389 A | 5/1993 | Loftis et al. | |
| 5,331,525 A | 7/1994 | Lawassani et al. | |
| 5,421,632 A | 6/1995 | Adomeit et al. | |
| 5,445,427 A | 8/1995 | Vandagriff | |
| 5,575,523 A | 11/1996 | Keller | |
| 5,576,898 A | 11/1996 | Rubin | |
| 5,611,591 A | 3/1997 | Van Devender | |
| 5,626,381 A | 5/1997 | Gervasoni et al. | |
| 5,673,957 A | 10/1997 | Moo et al. | |
| 5,762,246 A | 6/1998 | Drew | |
| 5,902,002 A | 5/1999 | Wilson | |
| 5,934,734 A | 8/1999 | Wilson | |
| 6,176,539 B1 | 1/2001 | Westerman | |
| 6,189,947 B1 | 2/2001 | Annan | |
| 6,224,137 B1 | 5/2001 | Hunker | |
| 6,290,280 B1 | 9/2001 | Riekse | |
| 6,328,370 B1 * | 12/2001 | Kim | B60J 3/0204 296/97.4 |
| 6,899,371 B1 | 5/2005 | Hammond | |
| 7,731,265 B1 | 6/2010 | Cohen | |
| 8,708,395 B1 | 4/2014 | Kim | |
| 9,669,685 B1 | 6/2017 | Yoshida | |
| 9,827,834 B1 | 11/2017 | Murat | |
| 11,511,604 B2 | 11/2022 | Johananoff | |
| 2002/0038959 A1 | 4/2002 | Francis et al. | |
| 2005/0110296 A1 | 5/2005 | Hammond | |
| 2006/0175862 A1 | 8/2006 | Asai | |
| 2009/0152892 A1 | 6/2009 | Bohner et al. | |
| 2009/0278374 A1 | 11/2009 | Akiya | |
| 2011/0109117 A1 | 5/2011 | Marcus et al. | |
| 2013/0001977 A1 | 1/2013 | Marcus | |
| 2013/0033060 A1 | 2/2013 | Marcus et al. | |
| 2013/0082479 A1 | 4/2013 | Marcus et al. | |
| 2013/0193712 A1 | 8/2013 | Marcus | |
| 2015/0047798 A1 | 2/2015 | Guina | |
| 2015/0197138 A1 | 7/2015 | Kuenzel | |
| 2018/0170155 A1 | 6/2018 | Yu | |
| 2018/0339575 A1 | 11/2018 | Johananoff | |
| 2019/0337362 A1 | 11/2019 | Shea | |
| 2022/0324303 A1 | 10/2022 | Johananoff | |

OTHER PUBLICATIONS

International Preliminary Report on Patentability dated Dec. 5, 2019 cited in Application No. PCT/US2018/034965, 7 pgs.

U.S. Non-Final Office Action dated Dec. 31, 2019 cited in U.S. Appl. No. 15/992,152, 10 pgs.

U.S. Non-Final Office Action dated Apr. 11, 2022 cited in U.S. Appl. No. 17/225,036, 19 pgs.

Related Design U.S. Appl. No. 29/833,488, filed Apr. 4, 2022 entitled "Vehicle Visory".

Related PCT Application No. PCT/US22/23910 filed Apr. 7, 2022 entitled "Vehicle Accessory Device and System".

International Search Report and Written Opinion dated Jul. 1, 2022 cited in Application No. PCT/US22/23910, 10 pgs.

* cited by examiner

VEHICLE ACCESSORY DEVICE AND SYSTEM

RELATED APPLICATION

The present application is a Continuation of U.S. application Ser. No. 17/225,036 filed on Apr. 7, 2021, which issues on Nov. 29, 2022 as U.S. Pat. No. 11,511,604, and having inventors in common, which is incorporated herein by reference in its entirety.

It is intended that the referenced application may be applicable to the concepts and embodiments disclosed herein, even if such concepts and embodiments are disclosed in the referenced application with different limitations and configurations and described using different examples and terminology.

FIELD OF INVENTION

The present invention relates to vehicle accessory devices and systems, such as interchangeable vehicle visor device and systems for shading.

BACKGROUND OF THE INVENTION

While driving, it is often necessary or desirable to selectively position various vehicle accessories, for example, selectively positioning a visor to shade oneself from potentially dangerous sun or bright glare or selectively positioning a dash cam to point in a specific direction. Vehicle visors are a common type of vehicle accessory device that are used to provide protection from sun or bright light in certain settings. For example, the vehicle visor can be pivoted down to offer protection from exposure directly ahead or can be positioned against the side window to shade sun or bright light coming through the side window. However, standard vehicle visors only offer protection from sun or shade coming from a single direction, and are difficult to move and position with the changing sun.

Accordingly, there remains a need for new vehicle accessory devices and systems, independent of the standard vehicle visor, which are capable of easily being moved in a number of positions and should preferably be able to be releasably secured to an existing vehicle structure. Further, it would be advantageous for the vehicle accessory devices to be easily movable between different vehicles and be able to connect various vehicle accessories in addition to visors. This need and other needs are satisfied by the various aspects of the present disclosure.

SUMMARY OF THE INVENTION

In accordance with the purposes of the invention, as embodied and broadly described herein, the invention, in one aspect, relates to a vehicle accessory device and system for connecting and selectively positioning vehicle accessories, such as, for example, a visor for providing shade or glare reduction.

In another aspect, the invention relates to a vehicle accessory system, the system comprising: a base plate assembly comprising a base plate and an articulating bracket, the base plate configured to be fixedly secured to a portion of a vehicle and the articulating bracket configured to be detachably couple with the base plate for securing to the vehicle, articulating bracket configured to be secured at a plurality of locations along the base plate; and at least one auxiliary visor panel or accessory connected to the base plate assembly.

In another aspect, the invention relates to a vehicle visor system, the system comprising a base plate assembly comprising a base plate and an articulating bracket, the base plate configured to be fixedly secured to a portion of a vehicle and the articulating bracket configured to be detachably couple with the base plate for securing to the vehicle, articulating bracket configured to be secured at a plurality of locations along the base plate; and at least one auxiliary visor panel connected to the base plate assembly.

In another aspect, the invention relates to an interchangeable vehicle accessory system comprising a base plate assembly including a base plate and an articulating bracket, the base plate configured to be fixedly secured to a portion of a vehicle and the articulating bracket configured to be releasably secured to the vehicle using the base plate at a plurality of locations along the base plate, the articulating bracket being configured to connect with a variety of vehicle accessories.

In another aspect, the invention relates to a vehicle accessory connection system comprising: a base plate assembly comprising a base plate and an articulating bracket, the base plate configured to be fixedly secured to a portion of a vehicle and the articulating bracket configured to be releasably secured to the vehicle using the base plate at a plurality of locations along the base plate; wherein the articulating bracket is configured to connect with at least one auxiliary visor panel or vehicle accessory.

In another aspect, the invention relates to a vehicle accessory connection device comprising a base plate; and an articulating bracket, the base plate configured to be fixedly secured to a portion of a vehicle and the articulating bracket configured to be releasably secured to the vehicle using the base plate at a plurality of locations along the base plate; wherein the articulating bracket is configured to connect with at least one vehicle accessory.

In another aspect, the invention relates to a system comprising an articulating bracket configured to releasably secured to a portion of a vehicle, the articulating bracket comprising a bracket base and a hinge body having first and second opposed ends, the first end of the hinge body configured to pivotably connect with the bracket base at a first pivot axis, and the second end of the hinge body configured to pivotably connect with an auxiliary visor panel or vehicle accessory at a second pivot axis. In further aspects, the system may include a base plate configured to be fixedly secured to a portion of a vehicle, wherein the articulating bracket configured to be detachably coupled with the base plate for securing to the vehicle. Accordingly, the articulating bracket may be configured to be secured at a plurality of locations along the base plate.

In further aspects, the invention also relates to methods for using the disclosed devices and systems. In still further aspects, the disclosed devices and systems work and are independent of the standard OEM vehicle visor, and thus, can be capable of easily being moved in a number of positions to provide multi-direction protection and functions.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several aspects of the invention and together with the description, serve to explain the principles of the invention.

DETAILED DESCRIPTION OF THE INVENTION

Figure 1A:
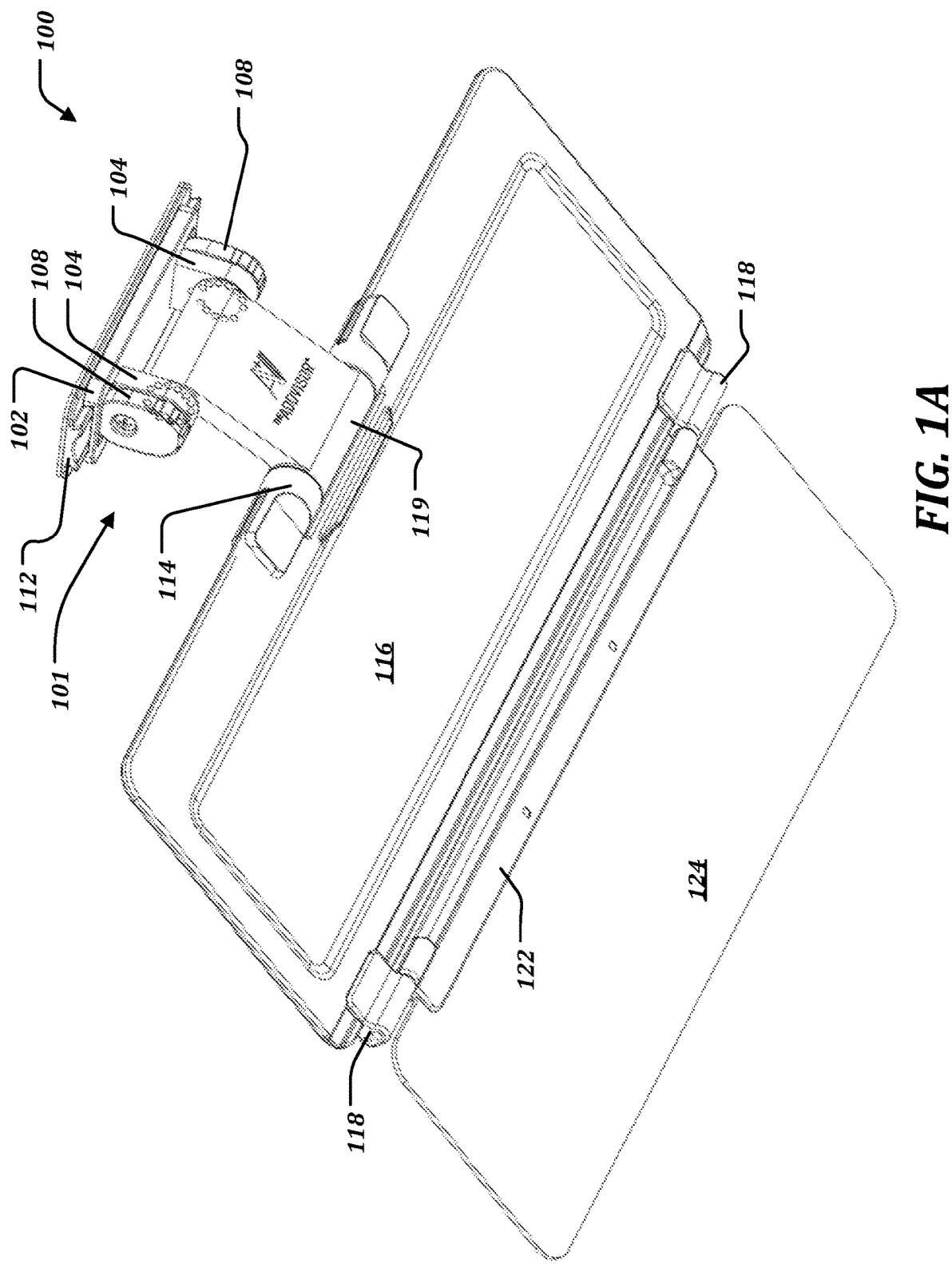
FIGS. 1A-1E show depictions of a visor system in accordance with an embodiment of the present invention.
Figure 1B:
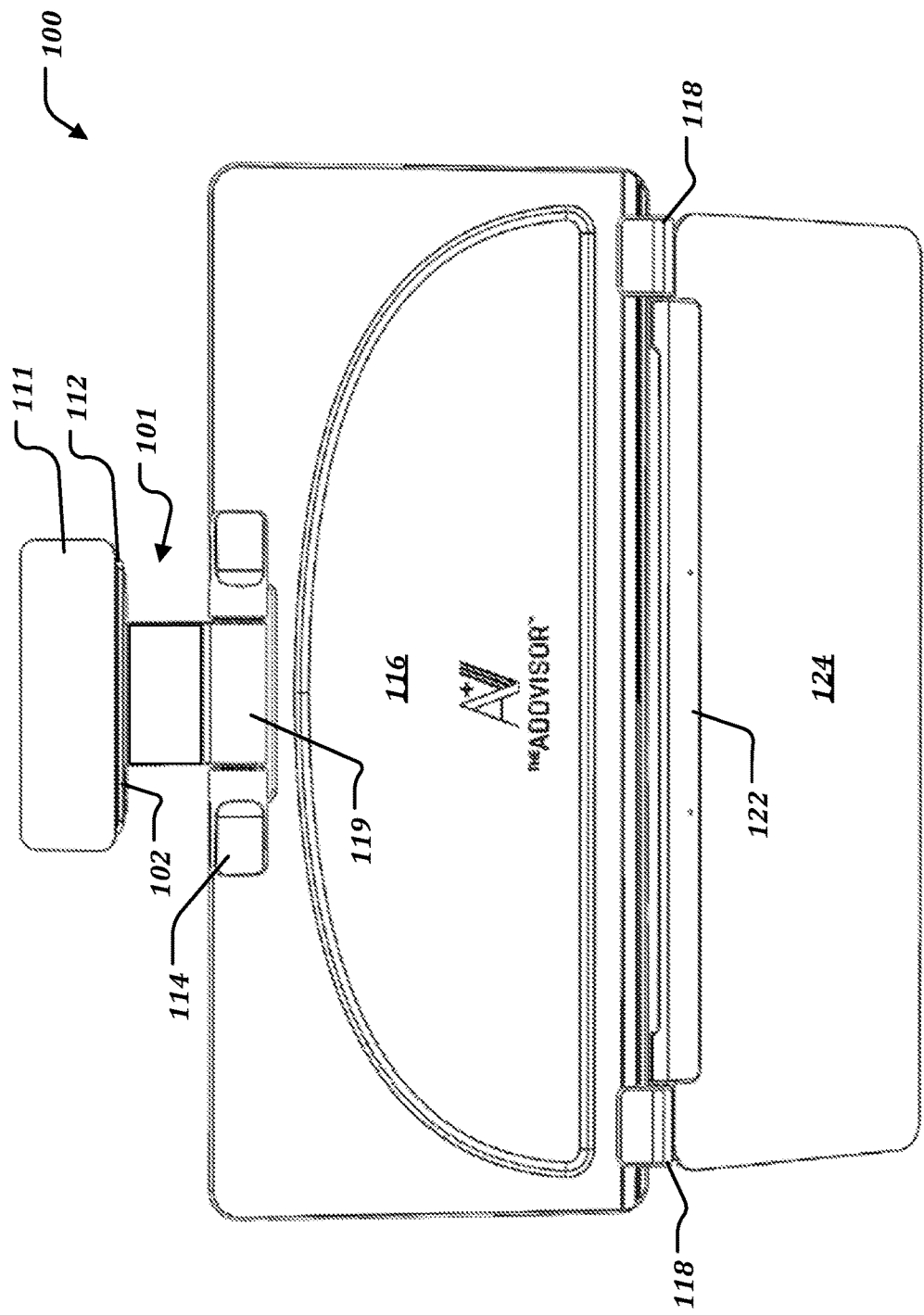
Figure 1C:
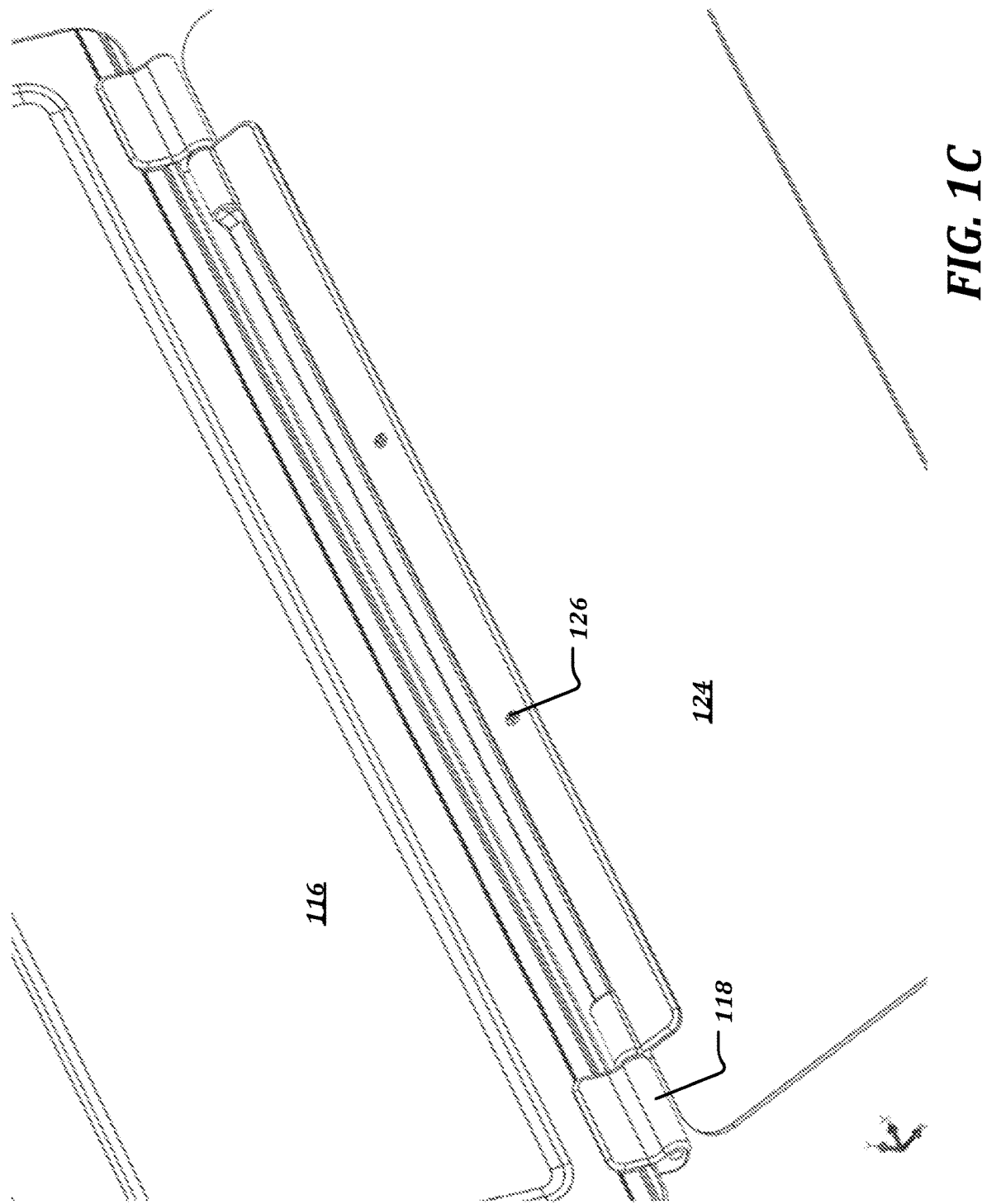
Figure 1D:
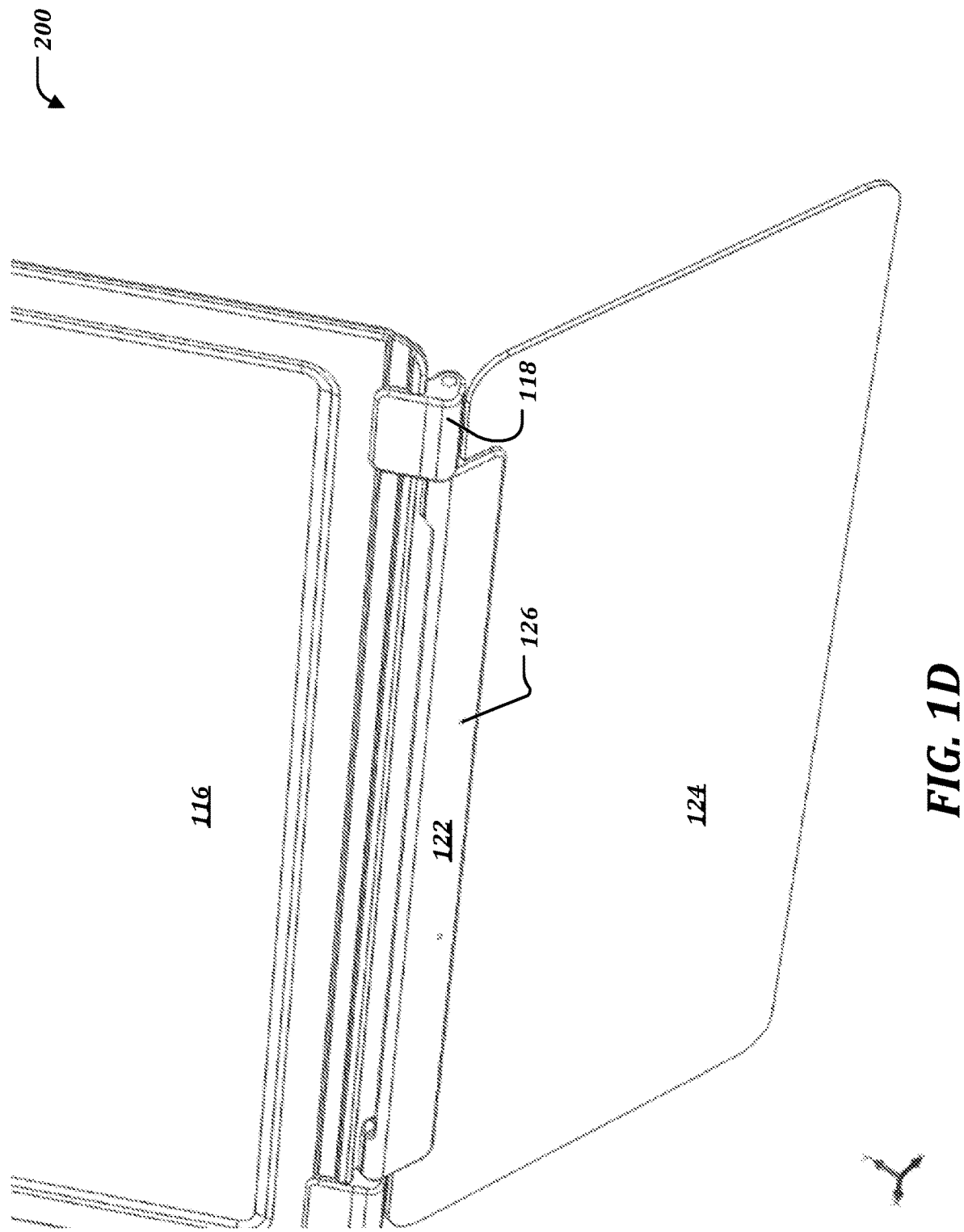
Figure 1E:
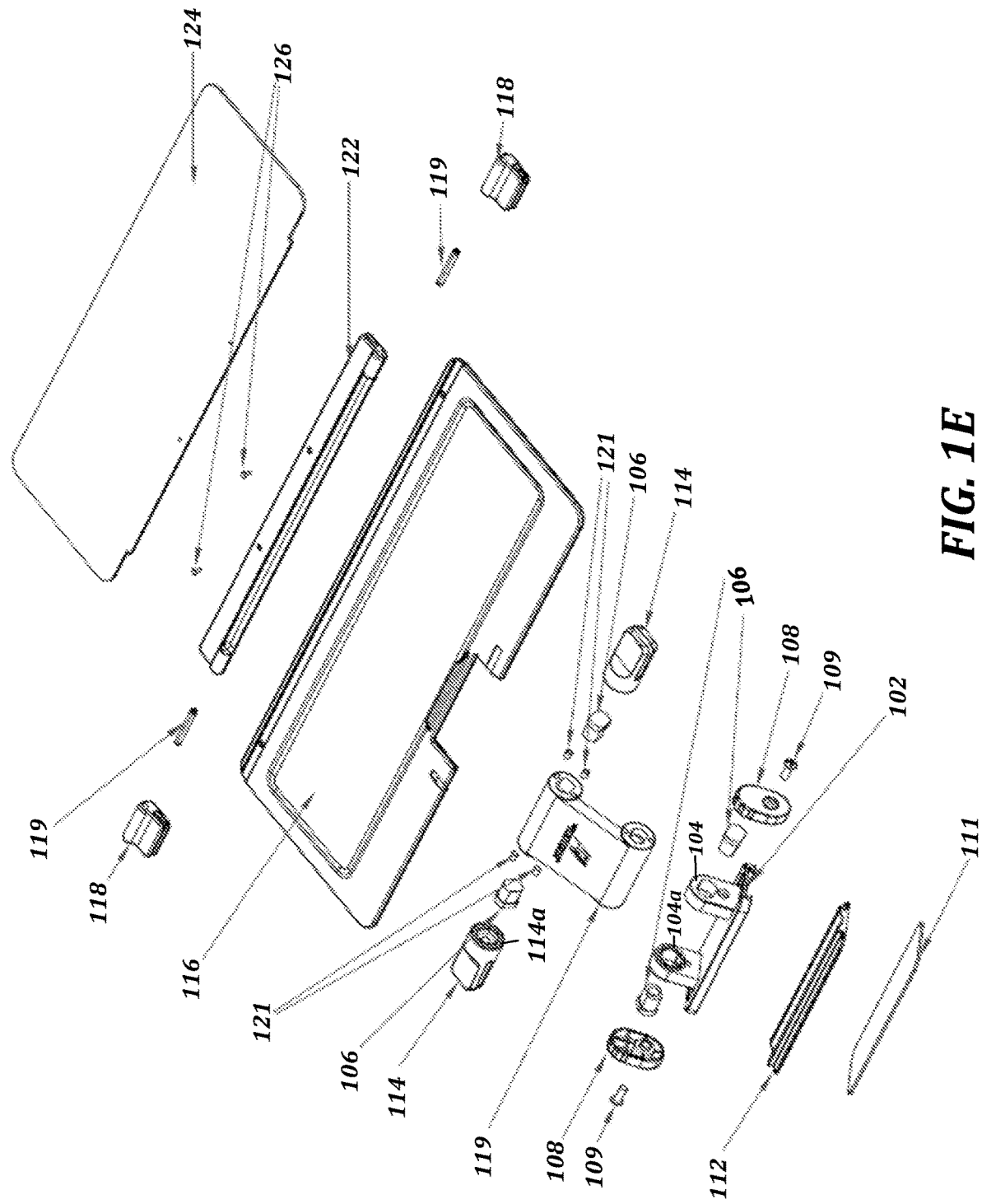
Figure 2A:
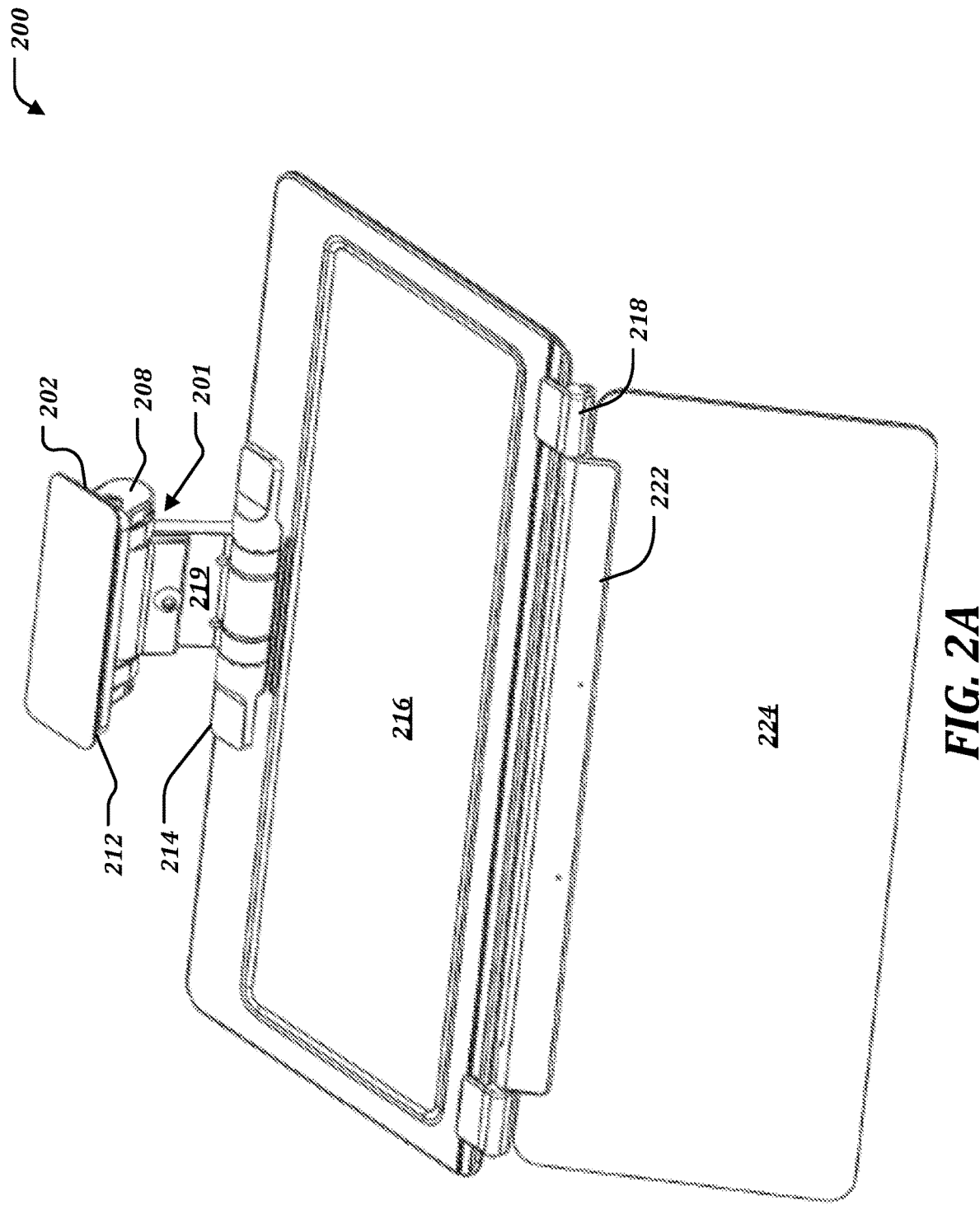
FIGS. 2A-2D show depictions of a visor system in accordance with an embodiment of the present invention.
Figure 2B:
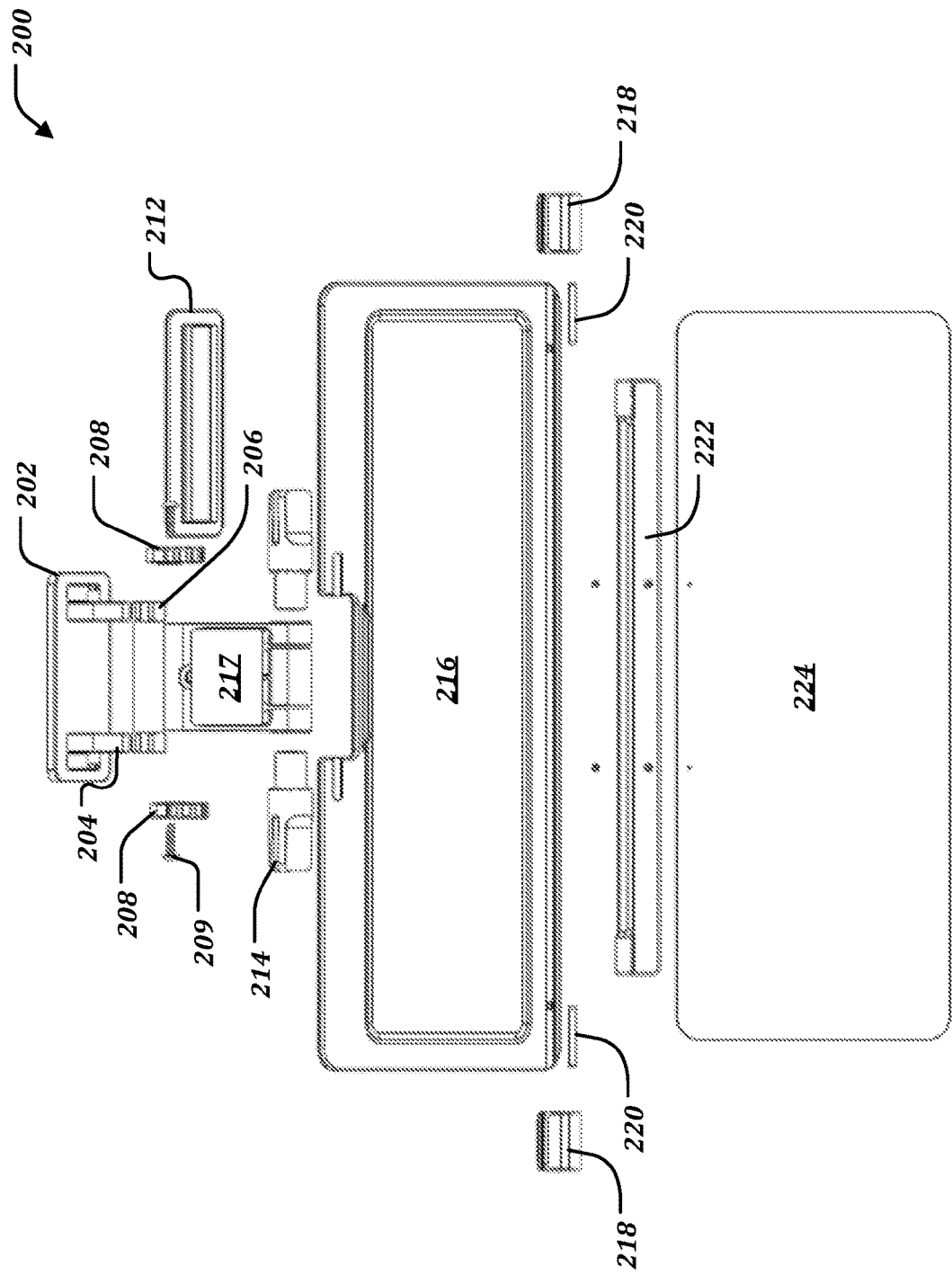
Figure 2C:
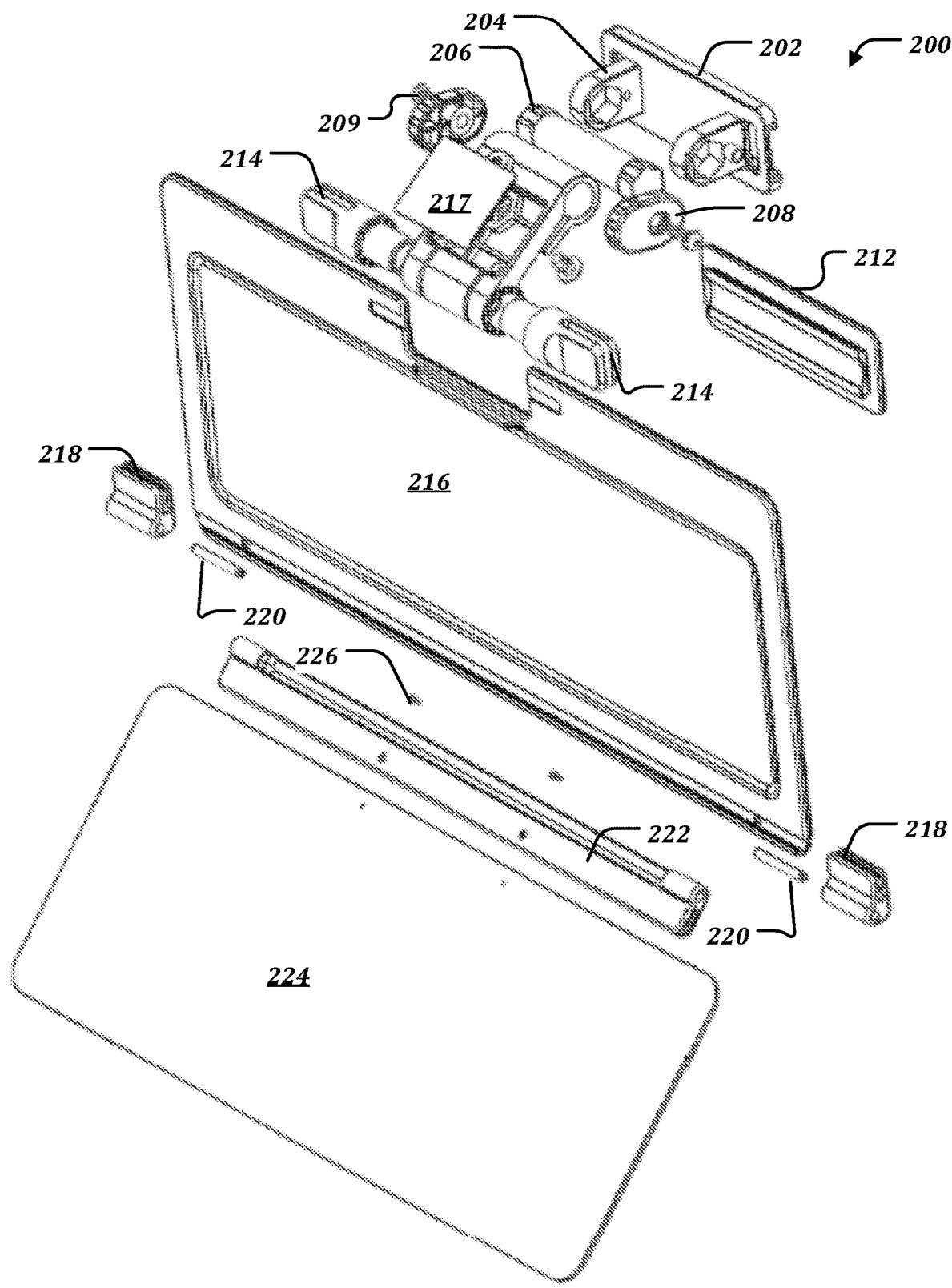
Figure 2D:
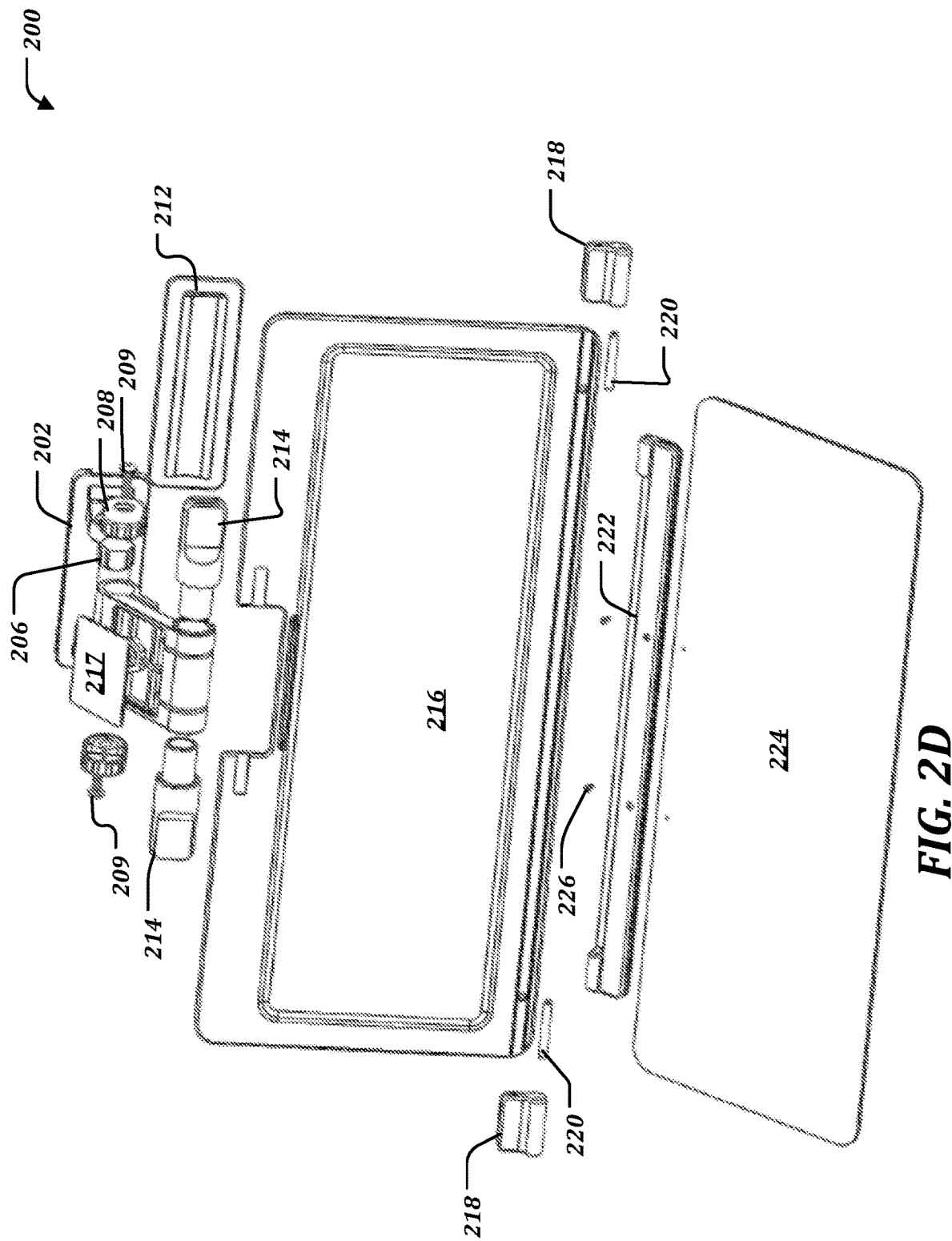

The present invention can be understood more readily by reference to the following detailed description of the invention and the Examples included therein.

Before the present articles, systems, devices, and/or methods are disclosed and described, it is to be understood that they are not limited to specific manufacturing methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

A. Definitions

It is also to be understood that the terminology used herein is for the purpose of describing particular aspects only and is not intended to be limiting. As used in the specification and in the claims, the term "comprising" can include the aspects "consisting of" and "consisting essentially of" Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "an aperture" includes two or more apertures.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Disclosed are the components to be used to manufacture the disclosed devices and articles of the invention as well as the materials themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the invention. Thus, if there are a variety of additional steps that can be performed it is understood that each of these additional steps can be performed with any specific aspect or combination of aspects of the methods of the invention.

It is understood that the devices and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

B. Accessory Device and System Overview

As briefly described above, the present disclosure relates, in various aspects, to accessory devices and systems for selectively mounting and positioning vehicle accessories, such as vehicle visors, dash cams, and the like. In one aspect, the present disclosure provides a vehicle accessory system comprising a base plate assembly comprising a base plate and an articulating bracket, the base plate configured to be fixedly secured to a portion of a vehicle and the articulating bracket configured to be detachably couple with the base plate for securing to the vehicle, articulating bracket configured to be secured at a plurality of locations along the base plate; and at least one auxiliary visor panel or accessory connected to the base plate assembly.

In another aspect, the present disclosure provides a visor system including a base plate assembly comprising a base plate and an articulating bracket, the base plate configured to be fixedly secured to a portion of a vehicle and the articulating bracket configured to be releasably secured to the vehicle using the base plate at a plurality of locations along the base plate; and at least one auxiliary visor panel connected to the base plate assembly.

In another aspect, the present disclosure provides a vehicle accessory connection system comprising a base plate assembly comprising a base plate and an articulating bracket, the base plate configured to be fixedly secured to a portion of a vehicle and the articulating bracket configured to be releasably secured to the vehicle using the base plate at a plurality of locations along the base plate. In further aspects, the articulating bracket may be configured to connect with a plurality of different accessories, such as an auxiliary visor panel or accessory.

In another aspect, the present disclosure provides a vehicle accessory connection device comprising a base plate and an articulating bracket configured to be releasably secured to the vehicle using the base plate at a plurality of locations along the base plate. The articulating bracket can then be used to connect a variety of vehicle accessories.

In various aspects, the system may comprise at least one base plate assembly. In further aspects, the base plate assembly generally comprises at one base plate (which may also be referred to herein as a "mounting plate") and at least one bracket configured to be releasably secured thereto. In still further aspects, the base plate assembly may comprise at one base plate and at least one articulating bracket. In some aspects, the system may comprise a plurality of base plates and/or brackets. A plurality of base plates may be fixedly mounted in various vehicles, allowing just the bracket to be moved between the cars. In still further aspects, the base plate assembly and/or articulating bracket may be configured to interchangeably connect with a plurality of auxiliary visor panels and/or accessories.

In further aspects, an articulating bracket of the present invention may comprise a bracket base connected with a hinge body or bracket body. In still further aspects, the articulating bracket may further comprise at least one hinge member configured to pivotably connect the bracket base and hinge body at a first connection axis or pivot axis. In yet further aspects, an auxiliary visor panel or accessory may be configured to releasably connect to the articulating bracket or hinge body at a second connection axis or pivot axis. To this end, the articulating bracket can comprise a bracket base, a hinge body, and at least one hinge member or mechanism configured to pivotably connect the bracket base and hinge body at a first pivot axis or connection axis. The articulating bracket may also comprise a second hinge member or mechanism configured to pivotably connect the hinge body and a visor panel or vehicle accessory at a second pivot axis or connection axis. Thus, in various embodiments, the articulating bracket can comprise a bracket base, a hinge body, a first hinge member or mechanism configured to pivotably connect the bracket base and hinge body at a first pivot axis or connection axis, and a second hinge member or mechanism configured to pivotably connect the hinge body and a visor panel or vehicle accessory at a second pivot axis or connection axis. In further aspects, the articulating bracket may comprise any mechanism capable of allowing movement, rotation or pivoting at the pivot or connection point, including but not limited to hinge mechanisms, hinges, joints, ball joints, and the like. In still further aspects, the articulating bracket may comprise at least one mechanism configured to pivotably connect the bracket at one or more pivot or rotation axes. In yet further aspects, the articulating bracket may comprise a plurality of mechanisms configured to pivotably connect the bracket at a plurality of pivot or rotation axes. In some embodiments, the articulating bracket may comprise a first mechanism configured to pivotably connect the bracket at the first pivot or rotation axis, and a second mechanism configured to pivotably connect the bracket at a second pivot or rotation axis. In other embodiments, the articulating bracket may comprise a first mechanism configured to pivotably connect a bracket base and first end of the hinge body at the first pivot or rotation axis, and a second mechanism configured to pivotably connect a second end of the hinge body and an auxiliary visor panel at a second pivot or rotation axis.

In some aspects, the bracket base may be configured to connect at a first pivot axis of the articulating bracket; and an auxiliary visor panel or other accessory may be configured to connect to the articulating bracket and/or hinge body at a second pivot axis. In other aspects, the bracket base may be configured to connect at a first connection axis of the articulating bracket; and an auxiliary visor panel or other accessory may be configured to connect to the articulating bracket and/or hinge body at a second connection axis. As is described in more detail herein, a hinge body (or bracket body) of the present invention may be configured to connect to the bracket base at a first pivot axis (or fixed connection axis) located at a first end of the hinge body, while an auxiliary visor panel or other accessory may be configured to connect to the hinge body at a second pivot axis (or fixed connection axis) located at an opposed second end of the hinge body. For example, according to some embodiments, the hinge body may be configured to rotatably connect to the bracket base at a first pivot axis located at a first end of the hinge body, while an auxiliary visor panel or other accessory is configured to rotatably connect to the hinge body at a second pivot axis located at an opposed second end of the hinge body. In other embodiments, the hinge body may be configured to rotatably connect to the bracket base at a first pivot axis located at a first end of the hinge body, while an auxiliary visor panel or other accessory is configured to fixedly connect to the hinge body at a second connection axis located at an opposed second end of the hinge body. To this end, one or both axes may be rotatable pivot axis and/or fixed connection axis. In further aspects, the bracket base may comprise one or more bracket posts, each bracket post being configured to secure an end of the hinge member. In still further aspect, each bracket post may comprise an aperture dimensioned and shaped to receive and secure an end of the hinge member. In some embodiments, each bracket post may comprise a plurality of grooves on an inner surface for receiving and retaining therein one or more ball plungers or pegs extending from the hinge body. The plurality of grooves may be configured to releasably retain one or more ball plungers or pegs for selectively securing the first end of the hinge body at a predetermined position along a first rotational axis.

In various aspects, the articulating bracket is configured to be releasably secured to the base plate in a fixed position using at least one securing component or securing means. More specifically, the bracket base may be configured to be releasably secured to the base plate in a fixed position using at least one securing means or securing component. In further aspects, the bracket base and base plate may be configured to couple using a tongue and groove arrangement, or the like. In still further aspects, the bracket base may comprise a groove or slot and the base plate may comprise a tongue or rail. Accordingly, the base plate tongue or rail inserts into the bracket base groove or slot, and then one or more one securing components is used to releasably secure the bracket base to the base plate in one or more desired positions along the length of the base plate. In yet further aspects, the bracket base may comprise a groove and the base plate may comprise a tongue or rail, and the bracket base groove and base plate tongue or rail cooperate to releasably secure the bracket base against the base plate in a fixed position using at least one securing component. In even further aspects, the bracket base groove, base plate tongue, and the securing component can cooperate to releasably secure the base plate assembly in a fixed position, more specifically, by releasably securing the bracket base to the base plate in a fixed position. In further aspects, the articulating bracket or bracket base may comprise a rotational joint that can be snapped into a receiving pocket on the base plate. In still further aspects, the system may further comprise a bridging piece to connect the base plate and the bracket. In some aspects, the bridging piece and the base plate are connected by tongue and groove but are not detachable, while the bridging piece can be releasably connected to the bracket via other means.

To this end, the bracket base, base plate, and securing component together comprise a unique sliding attachment mechanism, wherein the lockable bracket base slides onto a rail or groove on the base plate and the securing component releasably secures or otherwise locks the bracket base at a fixed position along the rail of the base plate. In an example mode of operation, the base plate may be fixedly mounted to the windshield and the bracket base would slide onto a rail or tongue portion of the base plate. This configuration and construction allow the articulating bracket to slide or move laterally along the base plate and be releasably secured at a plurality of different positions along the length of the base plate. Furthermore, using the present system, base plates can be any desired length and installed in multiple cars, allowing the articulating bracket to be installed in countless location and moved from one car and installed in another car.

In various aspects, the tongue and/or rail of the base plate may comprise a recessed portion, groove and/or slot, which is configured to interact with the securing component to releasably secure the bracket base to the base plate in a fixed position. By way of non-limiting example, in some embodiments, the base plate may additionally or alternatively comprise multiple slots that correspond to the various securing position along the base plate, and the bracket base has a groove to correspond with elevated rail portion of the base plate and securing component may be a depressible button configured to releasably couple with the slots on the base plate. In other embodiments, the securing component may be a rotatably button configured to press or friction fit against the base plate. According to further aspects, the base plate tongue may comprise a recessed portion, and the securing component may be configured to cooperate with the recessed portion to releasably secure the base plate assembly in a fixed position. In still further aspects, the base plate rail may comprise one or more slots, and the securing component may be configured to cooperate with one or more slots to releasably secure the base plate assembly in a fixed position. In even further aspects, the tongue and groove structure can slide, but comprise stops at both ends of the groove. For example, said stop could take the form of a snap-on plug at the end of the groove. To this end, the articulating bracket could still slide within the groove but would not be releasable unless one or more stops are removed.

In further aspects, the securing component may be configured to extend through an opening within the bracket base to cooperate with the base plate tongue or rail to releasably secure the bracket base to the base plate in a fixed position. For example, in some aspects, a base plate tongue may comprise a recessed portion or slot where the securing component is configured to extend through an opening within the bracket base to cooperate with the recessed portion or slot to releasably secure the bracket base to the base plate in a fixed position. In other aspects, a base plate rail may comprise a recessed portion or slot; and wherein the securing component is configured to extend through an opening within the bracket base to cooperate with the recessed portion or slot to releasably secure the base plate assembly in a fixed position.

In various further aspects, the base plate assembly and/or bracket base comprise a locked state and an unlocked state. In still further aspects, in the locked state, the base plate assembly and/or bracket base is secured to the base plate in a fixed position. In yet further aspects, in the unlocked state, the base plate assembly and/or bracket base is configured to travel, be moved, and/or otherwise be repositioned along the base plate at a plurality of positions. In even further aspects, in the unlocked state, the base plate assembly and/or bracket base is configured to move laterally along the base plate to a plurality of positions.

In further aspects, the least one securing means or securing component may comprise a plurality of securing means or securing components. In still further aspects, the securing means or securing component may be rotatably connected to at least one bracket post. In yet further aspects, a first securing means or securing component may be axially connected to a first bracket post. In even further aspects, a second securing means or securing component may be axially connected to a second bracket post. In even further aspects, a connection axis of the least one securing means or securing component may be offset with an axis of the at least one hinge member, where the securing component connection axis and hinge member axis are coplanar along a horizontal plane orthogonal to the base plate. In still further aspects, a first securing means or securing component may be coaxially connected to a first end of a first hinge member, and a second securing means or securing component may be coaxially connected to a second opposed end of the first hinge member. In yet further aspects, he securing means or securing component may be connected to the bracket base and/or bracket post and/or at least one hinge member. The securing means or securing component may be connected using a fastener or the like.

In various embodiments, the system may comprise a plurality of auxiliary visor panels. In further aspects, the auxiliary visor panel or other accessory may be pivotably connected to the base plate assembly at a second pivot or connection axis. In still further aspects, the auxiliary visor panel or other accessory may be pivotably connected to the base plate assembly or articulating bracket using an accessory connector, connecting component, or other connecting means. In yet further aspects, the auxiliary visor panel or other accessory may be pivotably connected to the base plate assembly using a hinge or joint.

In further aspects, the system may comprise a bracket body or hinge body comprising a first connection axis and a second connection axis. The hinge body may comprise a first channel corresponding to a first connection axis and configured to receive the hinge member. The hinge member may be configured to rotate about the first connection axis. In still further aspects, the hinge body may comprise a second channel corresponding to a second connection axis and configured to couple with at least one accessory connector or other connecting means. The second channel of the hinge body may comprise a first opening and a second opening, each opening configured to couple with one accessory connector or connecting means. The accessory connector may be configured to rotate about the second connection axis or may be fixedly connected.

In further aspects, an accessory connector or connecting means of the present disclosure may comprises a clip, clamp, hinge member, hinge mechanism, or a combination thereof. In some embodiments, the accessory connector or connection means may comprise a clamping portion at a first end and a coupling portion at a second end. The clamping portion may be configured to securing a portion of an auxiliary visor panel or other accessory to the clamping portion. In some aspects, the clamping portion may comprise a slot configured for receiving and securing a portion of an auxiliary visor panel or other accessory within the slot.

In further aspects, the coupling portion may be configured to couple with the hinge body, the articulating bracket, another accessory connector, or a combination thereof. The coupling portion may be integrated with the accessory connector or may be a separate element that is attached. In some embodiments, the coupling portion may comprise a protrusion, hinge member, damper component, or like component configured to couple with the hinge body by inserting into a hinge body channel. For example, the coupling portion may be configured to couple with the hinge body by inserting into a second channel at the second end of the hinge body for attaching a vehicle accessory, such as an auxiliary visor panel.

In some aspects, each accessory connector may comprise a plurality of grooves on an inner surface for receiving and retaining therein one or more ball plungers or pegs extending from the hinge body. The plurality of grooves of the accessory connector may be configured to releasably retain one or more ball plungers or pegs for selectively securing the second end of the hinge body at a predetermined position along a second rotational axis. In other aspects, the coupling portion may comprise a recessed portion at an outer end and an elevated portion positioned at an inner location from the recessed portion. The recessed portion may comprise a plurality of detents; where a corresponding surface of an inner portion of the hinge body channel comprises a plurality of detents, the recessed portion detents being configured to interact with the hinge body channel detents to maintain the accessory connector at a fixed position. The recessed portion may also comprise one or more relief cuts configured to allow the recessed portion detents to flex against the detents inside of the hinge body channel. To this end, a surface of an outer portion of the hinge body channel may comprise keyway grooves corresponding to locations and quantity of detents on the recessed portion, and where the recessed portion detents and keyway grooves are configured to cooperate to guide insertion of the protrusion into the hinge body channel according to a predetermined orientation. In still further aspects, the elevated portion may comprise a plurality of detents, where the elevated portion detents may be configured to cooperate with the keyway grooves in maintaining the accessory connector at a fixed position. In other embodiments, an accessory connector may comprise a coupling portion comprising a channel in place of the protrusion. The coupling portion channel may be configured to couple with another adjacent accessory connector, for example using a hinge member. In further aspects, the accessory connectors are coupled by inserting the hinge member in corresponding, coaxial channels of adjacent accessory connectors.

In some aspects, the base plate may be substantially planar. In other aspects, the base plate may comprise a void in the central portion. In further aspects, the base plate may comprise or otherwise take the form of a bracket. In still further aspects, the base plate may comprise a socket for receiving a pivot ball. In even further aspects, the base plate may comprise a pivot ball joint. In yet further aspects, the void in the central portion can comprise a socket for receiving a pivot ball configured to rotate about in the socket.

In further aspects, the base plate is releasably secured using a securing means. In still further aspects, the base plate can be releasably secured to a vehicle visor or roof. In yet further aspects, the base plate or bracket may comprise a plurality of securing means. In some aspects, the base plate or bracket comprises a rectangular shape. In other aspects, the base plate or bracket comprises a triangular shape, and is configured to be secured to a corner of the vehicle visor.

In further aspects, the base plate may comprise at least one aperture for receiving the securing means. In still further aspects, the base bracket may comprise a plurality of apertures for receiving the securing means. In yet further aspects, the base plate may comprise at least two apertures for receiving a securing means, the apertures being contained within a base plate edge. In even further aspects, a first end of the securing means may be detachably connected to the base plate by extending through a first aperture from a first side of the base plate to a second side of the base plate, and by extending through a second aperture from the second side of the base plate to the first side of the base plate.

In further aspects, the base plate may comprise a first side and a second side. In still further aspects, the first side of the base plate may be configured to be secured against a surface, such as, and without limitation, against an original equipment manufacturer (OEM) visor. In yet further aspects, the first side of the base plate may further comprise a gripping portion, such as, for example, to enhance grip against the surface to which it is secured. In even further aspects, the second side of the base plate may comprise a pivot ball joint. In some aspects, the first side of the base plate may comprise a gripping portion, such as, for example, to enhance grip against the surface to which it is secured, and the second side of the base plate may comprise a pivot ball joint.

In further aspects, the device and system may further comprise an extendable member, the extendable member having first and second opposed ends. In still further aspects, the extendable member may be connected to the auxiliary panel at a first end. In yet further aspects, the extendable member may comprise an extension rod. In even further aspects, the extendable member may be connected to the auxiliary panel at a first end and may comprise an extension rod at a second end. In still further aspects, the extendable member may comprise a flexible portion at a first end and a rigid portion at a second end. In yet further aspects, the extension rod may be configured to telescope from within the extendable member or an extendable member housing. In even further aspects, at least a portion of the extendable member may be configured to be releasably secured to an OEM visor retention device or clip.

According to the various aspects described herein, the base plate assembly is configured to connect with at least one auxiliary panel and/or auxiliary accessory. In some embodiments, the base plate assembly is configured to connect with at least one auxiliary panel. The auxiliary panel may further comprise a glare shield movably connected to the auxiliary visor panel. The glare shield is movably connected to the auxiliary visor panel using an accessory connector described above. In other embodiments, the base plate assembly is configured to connect with at least one auxiliary accessory. The auxiliary accessory may comprise at least one of: a flat rectangular fan, Heads-Up-Projector (HUD), dash camera, back up camera display, auxiliary rearview mirror for expanding viewable area, or a combination thereof, or the like. To this end, system would allow user to interchange an articulating bracket with an auxiliary visor panel configuration with another articulating bracket connected to auxiliary accessor to fit their needs.

In further aspects, the auxiliary panel comprises at least one of: at least one internal housing and at least one outer casing. In still further aspects, the auxiliary panel comprises at least one internal housing and at least one outer casing. In yet further aspects, the internal housing may comprise a first internal housing panel and a second internal housing panel.

In further aspects, the auxiliary visor panel can be pivotably connected using a connecting means. In even further aspects, the auxiliary visor panel can be pivotably connected using a pivot ball joint, or the like. In various aspects, the auxiliary visor panel can work with existing vehicle visor to extend the range of shading or blocking of sun. For example, in some aspects, the auxiliary visor panel can be pivotally mounted to a vehicle visor such that it can pivot downwardly and away from the primary visor without encroaching in the user's space when the vehicle visor is in the side window position.

In further aspects, the pivot ball joint can comprise a pivot ball with a pin extending therefrom, a socket for receiving said ball, and a cover plate for securing the pivot ball in the socket. In even further aspects, the pivot ball can provide motion to the auxiliary visor. In still further aspects, the cover plate comprises guide slots configured to receive the pin and control the motion of the auxiliary visor panel.

In various aspects, the cover plate can be configured to allow the auxiliary visor panel to move to a predetermined position. In further aspects, the pivot ball joint can also comprise a retaining means configured to hold the auxiliary visor panel in a predetermined position, for example, by adding friction at the pivot ball connection. In still further aspects, the retaining means can comprise a friction fitting, snap ring, O-ring, pressure fitting, clip, clasp, and the like. In even further aspects, the snap ring or O-ring can be retained within a groove to accommodate the snap ring or O-ring.

In father aspects, the retaining means may comprise an adjustment knob or member. In still further aspects, the adjustment knob or member may include at least one of a clamping arm and clamping face. In yet further aspects, the adjustment knob or member may be configured to control the motion of the auxiliary visor panel by adjusting the adjustment knob or member towards and away from the pivot ball. In even further aspects, the adjustment knob or member may be configured to prevent motion of the auxiliary visor panel by screwing the adjustment knob or member towards the pivot ball. In still further aspects, the adjustment knob or member may be configured to allow motion of the auxiliary visor panel by screwing the adjustment knob or member away from the pivot ball. In yet further aspects, the adjustment knob or member may be configured to control the motion of the auxiliary visor panel by tightening a clamping face of the adjustment knob or member against the pivot ball. In even further aspects, the adjustment knob or member may be configured to prevent movement of the auxiliary visor panel by tightening a clamping face of the adjustment knob or member against the pivot ball. In still further aspects, the adjustment knob or member may be configured to fix the auxiliary visor panel position by tightening a clamping face of the adjustment knob or member against the pivot ball. In some aspects, a clamping face of the adjustment knob or member may have an arcuate shape substantially matching the shape of the pivot ball. In other aspects, a clamping face of the adjustment knob or member may have an arcuate shape identically matching the shape of the outer portion of pivot ball.

In further aspects, the cover plate can be configured to allow the auxiliary visor panel to move to a plurality of predetermined positions. In still further aspects, the cover plate can be configured to allow the auxiliary visor panel to move from a first predetermined position to a second predetermined position or a third predetermined position, or any combination thereof. In yet further aspects, the predetermined position can comprise a stowed position against the vehicle visor, a side window position, or an extended position against the windshield, or any combination thereof.

In further aspects, the auxiliary visor panel can comprise a cavity or void for receiving the glare shield. In some aspects, the glare shield can be slidably connected to the auxiliary visor panel. In other aspects, the glare shield can be pivotably connected to the auxiliary visor panel. In still further aspects, the glare shield can be connected using a connecting means. In yet further aspects, the glare shield can be configured to extend from the auxiliary visor panel to reduce glare or bright light when the auxiliary visor panel is a raised position. In yet further aspects, the system can comprise a button or other release mechanism configured to release a component, such as, for example, the glare shield from a secured position.

In various aspects, the base plate may comprise at least one securing means configured to be secured to first portion of a vehicle visor; and the auxiliary panel may also comprise at least one securing means configured to be secured to a second portion of a vehicle visor. In further aspects, the at least one securing means of the auxiliary panel comprises a magnet and corresponding magnetic element, the magnet being configured to magnetically couple with the corresponding magnetic element. In still further aspects, at least a portion of the auxiliary securing means may be disposed within the auxiliary panel. In yet further aspects, the magnet may be disposed within the auxiliary panel. In even further aspects, the magnet may be disposed within the internal housing of the auxiliary panel. In still further aspects, the magnet may be disposed within the internal housing of the auxiliary panel and the corresponding magnetic element is disposed on a surface of or within a vehicle visor, such as an OEM visor. In various further aspects, the magnetic element may comprise a metal plate, or other magnetic plate.

In further aspects, the base plate can comprise a plurality of securing or connecting means, such as, and without limitation, VELCRO at one portion and a clamping mechanism on another portion of the base plate. In still further aspects, the base plate can comprise a securing means for releasably securing the auxiliary visor panel to the base plate. In yet further aspects, the base plate can have a rectangular, arcuate, V-shaped, oval, round, or cylindrical shape.

In further aspects, the glare shield can be comprised of an UV-reducing and/or glare-reducing material, or a combination thereof. In still further aspects, the glare shield can be comprised of an opaque, micro-louver, transparent, tinted, translucent, polarized, phototropic, electrochromic, fabric, cloth, plastic, woven or non-woven, natural or synthetic material, or combinations thereof. In some aspects, the glare shield can comprise a tinted acrylic panel.

In further aspects, disclosed herein are visor systems comprising: at least one base bracket configured to be releasably secured to a portion of a vehicle, the base bracket comprising a plurality of securing means configured to be secured to a plurality of portions of the vehicle visor; at least one auxiliary visor panel pivotably connected to the base bracket using a pivot ball joint; wherein the pivot ball joint comprises a pivot ball with a pin extending therefrom, a magnetic socket for receiving said ball, and a retaining means for securing the pivot ball in the socket; and a glare shield movably connected to the auxiliary visor panel.

In further aspects, the disclosed visor systems, and portions thereof, may be installed as OEM equipment in vehicles. For example, in some aspects, the base plate or base bracket may be present as an OEM vehicle part, and the auxiliary visor panel may be configured to be attached to the OEM part by inserting the pivot ball in the socket. In still further aspects, the visor system can comprise at least one auxiliary visor panel configured to be pivotably connected to a portion of a vehicle roof or visor using a pivot ball joint; wherein the pivot ball joint comprises a pivot ball with a pin extending therefrom, a socket or magnetic socket for receiving said ball, and a retaining means for securing the pivot ball in the socket; and a glare shield movably connected to the auxiliary visor panel. In other aspects, the base plate may be an OEM vehicle visor comprising a socket for receiving the pivot ball, and the auxiliary visor panel sold separately, such as a dealer installed option, and is configured to be attached by inserting the pivot ball in the OEM installed socket.

In various aspects, the securing means comprises a clip, clamp, latch, bracket, snap, fitting, clasp, Velcro, strap, tie wraps, hook and latch, loop and tie, cable, elastic, band, button and buttonholes, or combinations thereof. In further aspects, the connecting means comprises a hinge or similar connecting mechanism. In further aspects, the components can be releasably connected. In a still further aspect, the connection can be achieved using a snap, friction fitting, snap ring, O-ring, pressure fitting, clip, clasp, and the like. The snap ring or O-ring can be retained within a groove to accommodate the snap ring or O-ring. In a further aspect, the system can comprise an engagement means for coupling and holding components together. In a further aspect, the engagement means can be a screwing mechanism, a click-lock mechanism, or friction mechanism, or the like. In other aspects, the connecting means can comprise a fitting, insert, adhesive, tape, screw, snap fit, glue, brazing, soldering, welding, spot weld, screw with nut, or rivet, or a combination thereof.

In further aspects, the system may comprise first and second auxiliary visor panels that flushly nest with the other components when in a closed position. In still further aspects, the base plate can be rotatably connected to a first edge of the first auxiliary visor panel, and the second auxiliary visor panel is rotatably connected to a different edge of the first auxiliary visor panel. The second auxiliary visor panel may be nestably connected to the first auxiliary visor panel, and the second auxiliary visor panel comprises a first edge configured to releasably couple with a first auxiliary visor panel edge and a second edge configured to releasably couple with a base plate edge. In even further aspects, a first auxiliary visor panel may comprise three edges that define a portion of a cavity for receiving a portion of the second auxiliary visor panel. In even further aspects, one surface of the base plate may comprise an elevation portion and a recessed portion, the recessed portion being configured to nestably receive at least a portion of the first auxiliary visor panel, and the elevated portion of the base plate and the cavity of the first auxiliary visor panel forming a substantially planar surface when in the nesting position. In further aspects, the system may comprise a support clip configured to releasably secure a portion of the auxiliary visor panel adjacent to a portion of the vehicle visor, and a glare shield movably connected to the auxiliary visor panel.

According to various aspects, embodiments of the present invention provide a number of advantages over prior solutions. Without wishing to be bound by a particular theory, in one aspect, the combination of inventive base plate and articulating bracket connecting configurations, and/or securement devices allow the disclosed system to be used in numerous positions and with numerous vehicle accessories. In further aspects, embodiments of the present system eliminate the need to uninstall your existing vehicle visor and/or replace the hinges and mounts before installing a double visor which won't fit most vehicles as well as the original visor. In still further aspects, embodiments of the disclosed system do not attach to the OEM car visor, and, thus, can provide independent multi-direction glare or sun blocking. By way of non-limiting example, Sun glare may first appear through windshield, but when you turn the sun glare then comes through the side window. A driver must keep moving the OEM car visor to block the sun glare while driving, which can be a dangerous distraction. In even further aspects and as further described herein, the present invention solves this problem by allowing the driver to independently position the system and the OEM car visor to concurrently block glare through the windshield and the side window at the same time. In contrast, multi-direction glare blocking is not possible with flip down auxiliary visors that attach to the OEM car visor. In yet further aspects, the disclosed system can be used in any vehicle, including trucks, recreational vehicles, golf carts, all-terrain vehicles, tractors, construction vehicles, and boats. As described herein, the disclosed system can be installed with a few quick steps in under 2 minutes. Further, the bracket can easily unlock and be moved to another car as needed.

C. Accessory Device and System Configuration

According to various aspects of the invention, the shading devices and systems can comprise multiple configurations. Various exemplary embodiments of the inventive visor devices and systems and methods for using same are shown in FIGS. 1-10.

In further aspects, FIGS. 1A-1E show various views and perspectives of an exemplary accessory system 100 and components in accordance with the present invention. As shown, system 100 comprises base plate assembly comprising base plate 112 and articulating bracket assembly 101, where base plate 112 is configured to be fixedly secured to a portion of a vehicle and articulating bracket assembly 101 is configured to be releasably secured to the base plate, which can be at a plurality of locations along the base plate. Auxiliary visor panel 116 is connected to the base plate assembly and bracket using main accessory connector 114. Glare shield 124 is attached to panel accessory connector 118 using fastening or connecting means in the form of screws 126, and is movably connected to auxiliary visor panel 116 using panel accessory connector 118 and shield accessory connector 122. Base plate 112 can be attached using adhesive backing 111.

Bracket assembly 101 includes bracket base 102, hinge body 119, a damper member 106 configured to pivotably connect the bracket base and hinge body at first mounting axis, a pair of bracket posts 104 configured to secure an end of the damper member, and two position locks 108 rotatably connected to bracket posts using position lock screw 109. Position lock connection axis and first mounting axis are coplanar along a horizontal plane orthogonal to the base plate. Bracket base 102 comprises a groove and base plate 112 comprises a tongue or groove, and the bracket base groove and base plate tongue cooperate to releasably secure bracket base against base plate in a fixed position using one or both position locks 108. Base plate rail comprises a recessed portion; and position lock is configured to extend through an opening within bracket base 102 to cooperate with the recessed portion to releasably secure the bracket base 102 (and all components connected thereto) to base plate 112 in a fixed position. One or both position locks 108 may be used secure bracket base 102 to base plate 112, depending on specific position of the bracket base 102 on the base plate 112.

Bracket posts 104 on base bracket 102 comprise a plurality of grooves 104a arranged in a circle on an inner surface for receiving and retaining therein ball plungers 121 which are either extending from or are installed in the side hinge body, near hinge body channels that receive damper members. The plurality of grooves are configured to releasably retain ball plungers for selectively securing the first end of the hinge body at a predetermined position along a first rotational axis. Accessory connector 114 also have a plurality of grooves 114a on an inner surface for receiving and retaining therein ball plungers 121 extending from the other end of the hinge body. The plurality of grooves of the accessory connector are also configured to releasably retain the two ball plungers for selectively securing the second end of the hinge body at a predetermined position along a second rotational axis.

In further aspects, FIGS. 2A-6B show various views and perspectives of an exemplary accessory system 200 and components in accordance with the present invention. As shown, system 200 comprises base plate assembly comprising base plate 212 and articulating bracket assembly 201, where base plate 212 is configured to be fixedly secured to a portion of a vehicle and articulating bracket assembly 201 is configured to be releasably secured to the base plate 212, which can be at a plurality of locations along the base plate. Auxiliary visor panel 216 is connected to the base plate assembly and bracket using main accessory connector 214; and glare shield 224 is attached to panel accessory connector 218 using screws 226, and is movably connected to auxiliary visor panel 216 using panel accessory connector 218 and shield accessory connector 222.

Figure 3A:
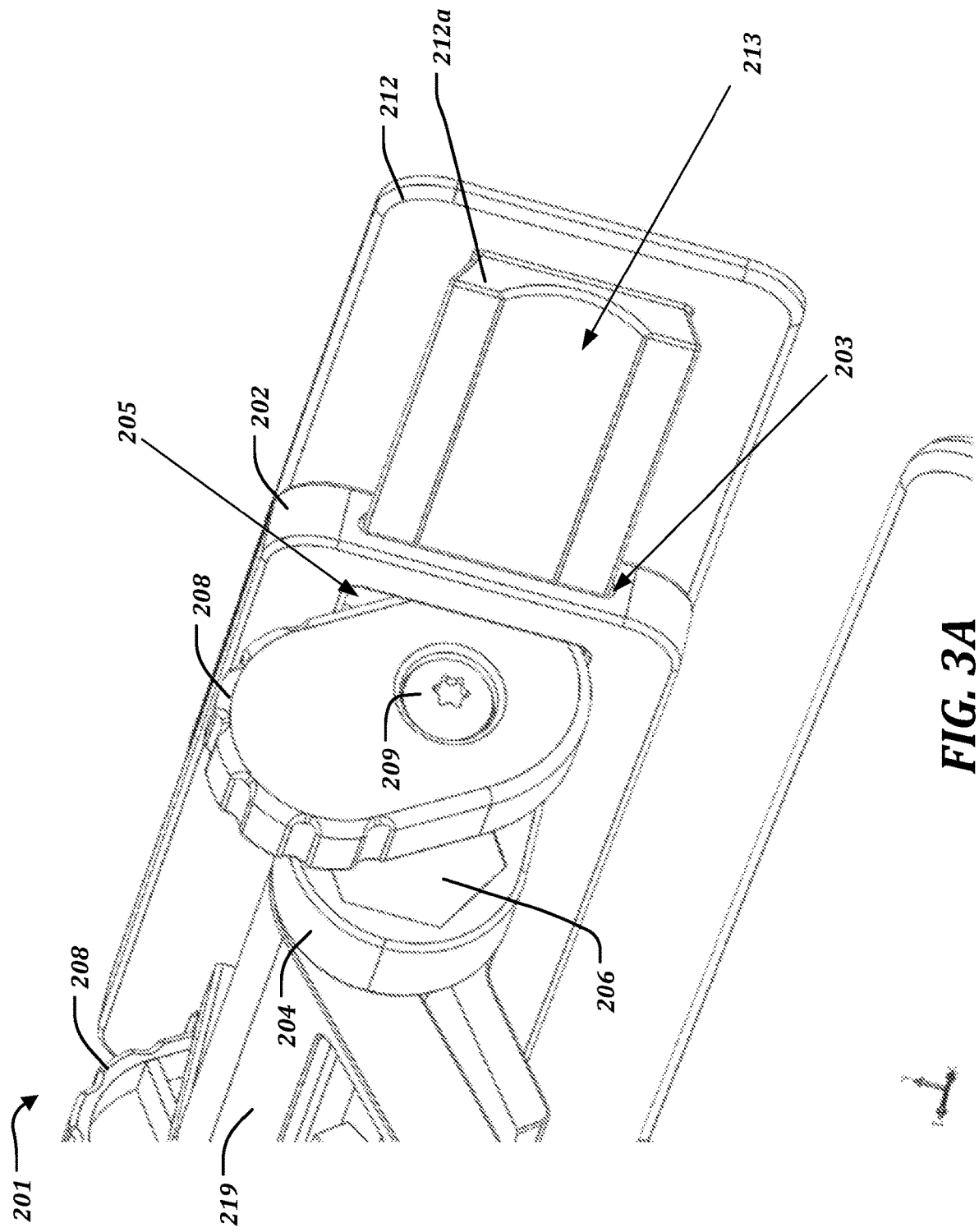
FIGS. 3A-3D show depictions of a base plate and articulating bracket in accordance with an embodiment of the present invention.
Figure 3B:
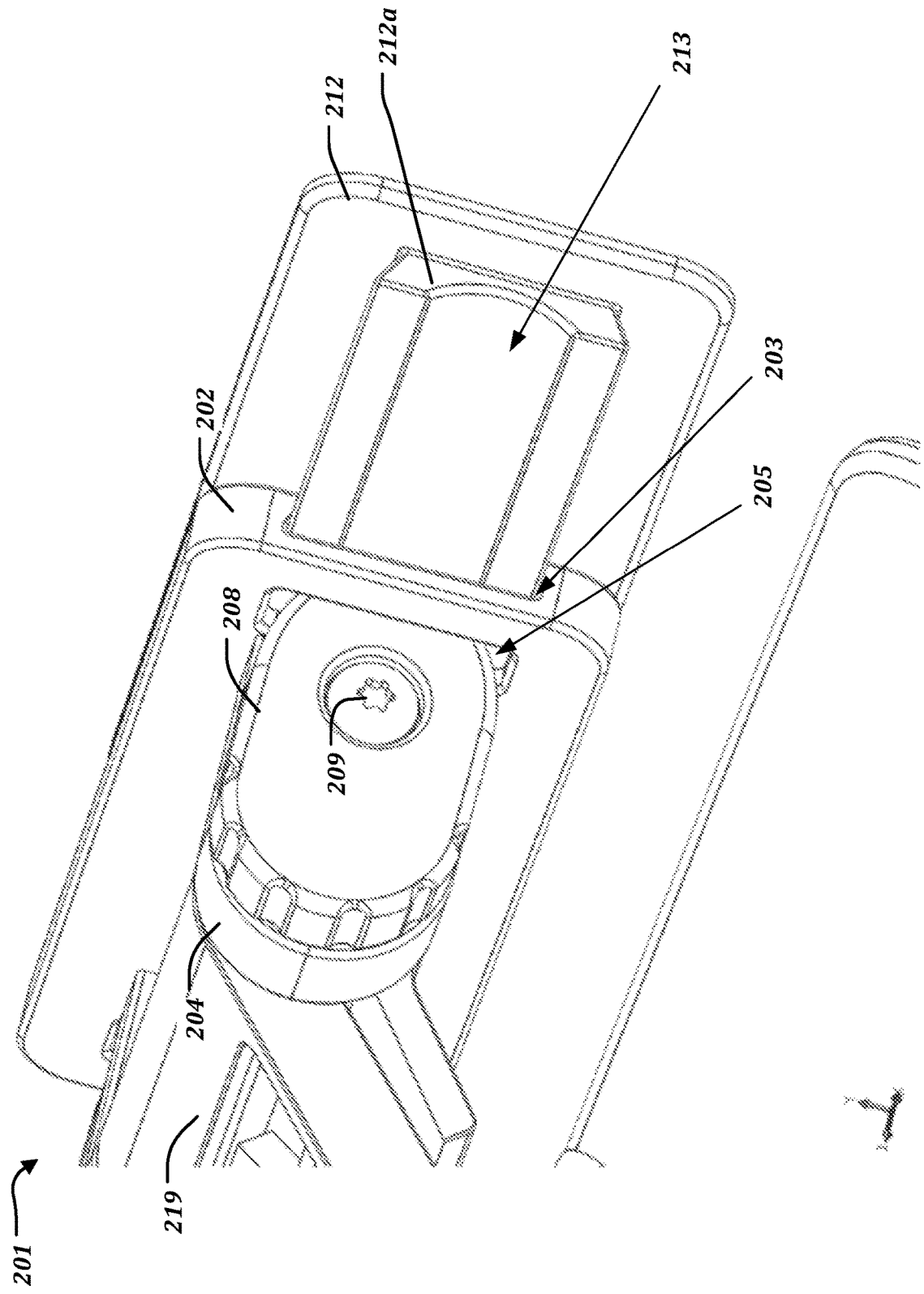
Figure 3C:
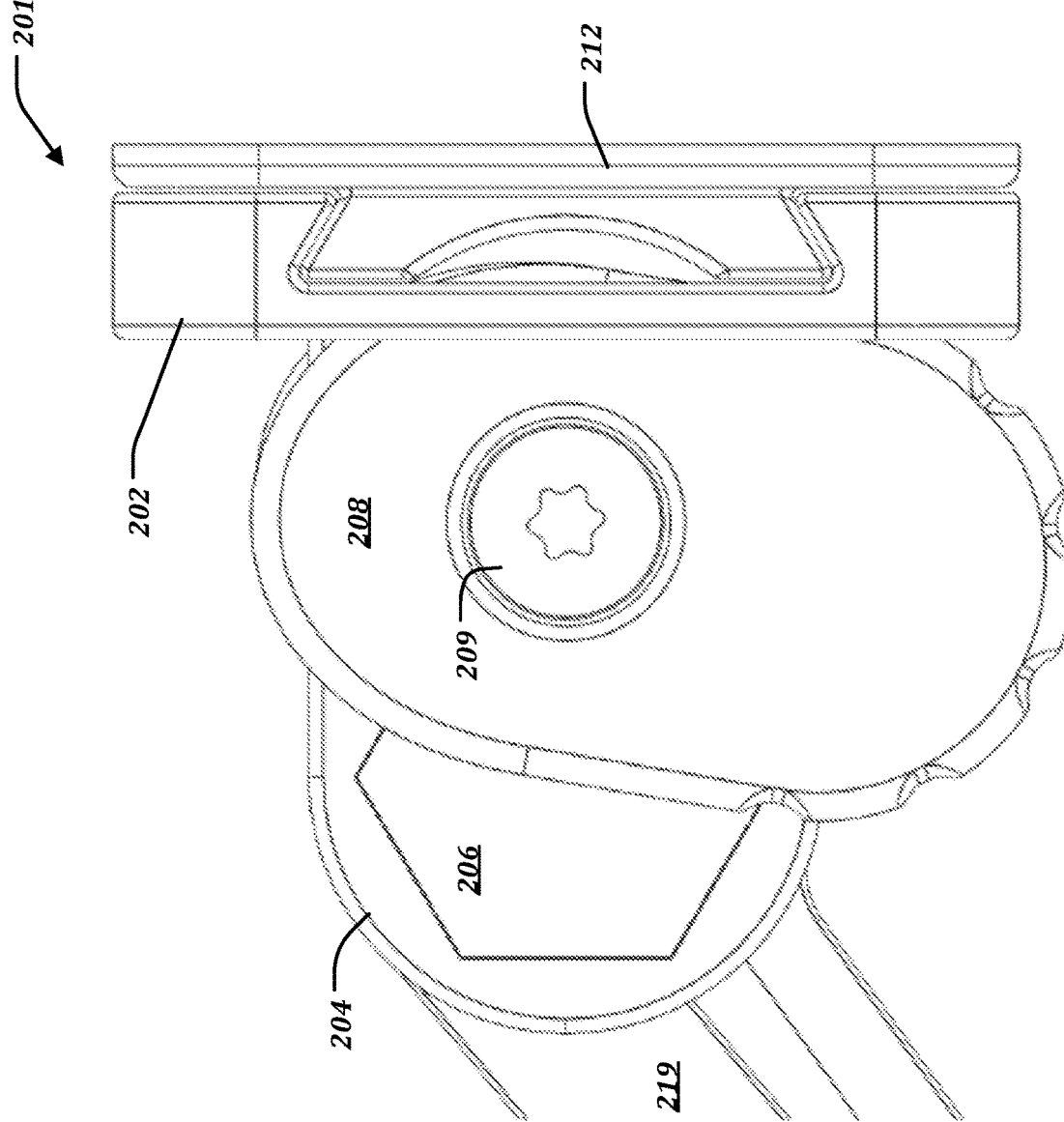
Figure 3D:
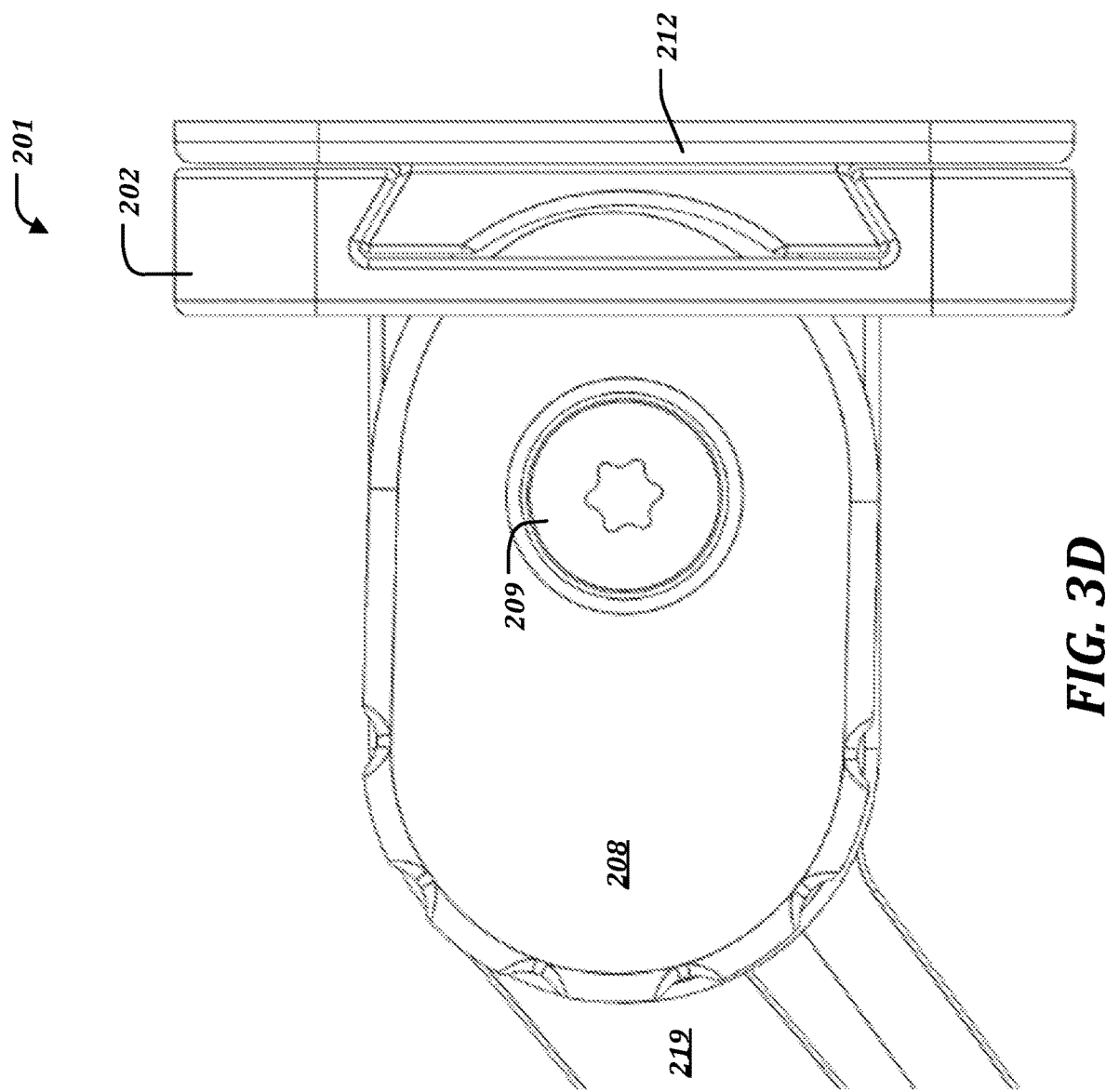

FIGS. 3A-3D show various views of an embodiment of articulating bracket assembly 201 comprising bracket base 202, hinge body 219, first hinge member 206 configured to pivotably connect the bracket base and hinge body at first mounting axis, a pair of bracket post 204 configured to secure an end of the hinge member, and two position locks 208 rotatably connected to bracket posts using position lock screw 209. A connection axis of position lock 208 is offset with first mounting axis of first hinge member, position lock connection axis and first mounting axis are coplanar along a horizontal plane orthogonal to the base plate. Bracket base 202 comprises a groove 203 and base plate 212 comprises rail 212a, and the bracket base groove and base plate rail 212a cooperate to releasably secure bracket base against base plate in a fixed position using one or both position locks 208. Base plate rail 212a comprises a recessed portion; and position lock 208 is configured to extend through an opening 205 within bracket base 202 to cooperate with the recessed portion 213 to releasably secure the bracket base 202 (and all components connected thereto) to base plate 212 in a fixed position. One or both position locks 208 may be used secure bracket base 202 to base plate 212, depending on the length of base plate 212 and the specific position of the bracket base 202 on the base plate 212. To the end, and while base plate 212 is show as having as substantially similar length (or width) as bracket base 202, this is not a requirement. Base plate 212 can be any desired length to allow for position along extended areas of the car, for example, from the driver's side all the way over to the passenger's side. In further aspects, system and bracket assembly 201 can comprise a locked state and an unlocked state. As shown in FIGS. 3A and 3C, in the unlocked state, bracket base is configured to is configured to move laterally along the base plate to a plurality of positions. As shown in FIGS. 3B and 3D, in the locked state, bracket base 202 is secured to the base plate 212 in a fixed position.

Figure 4A:
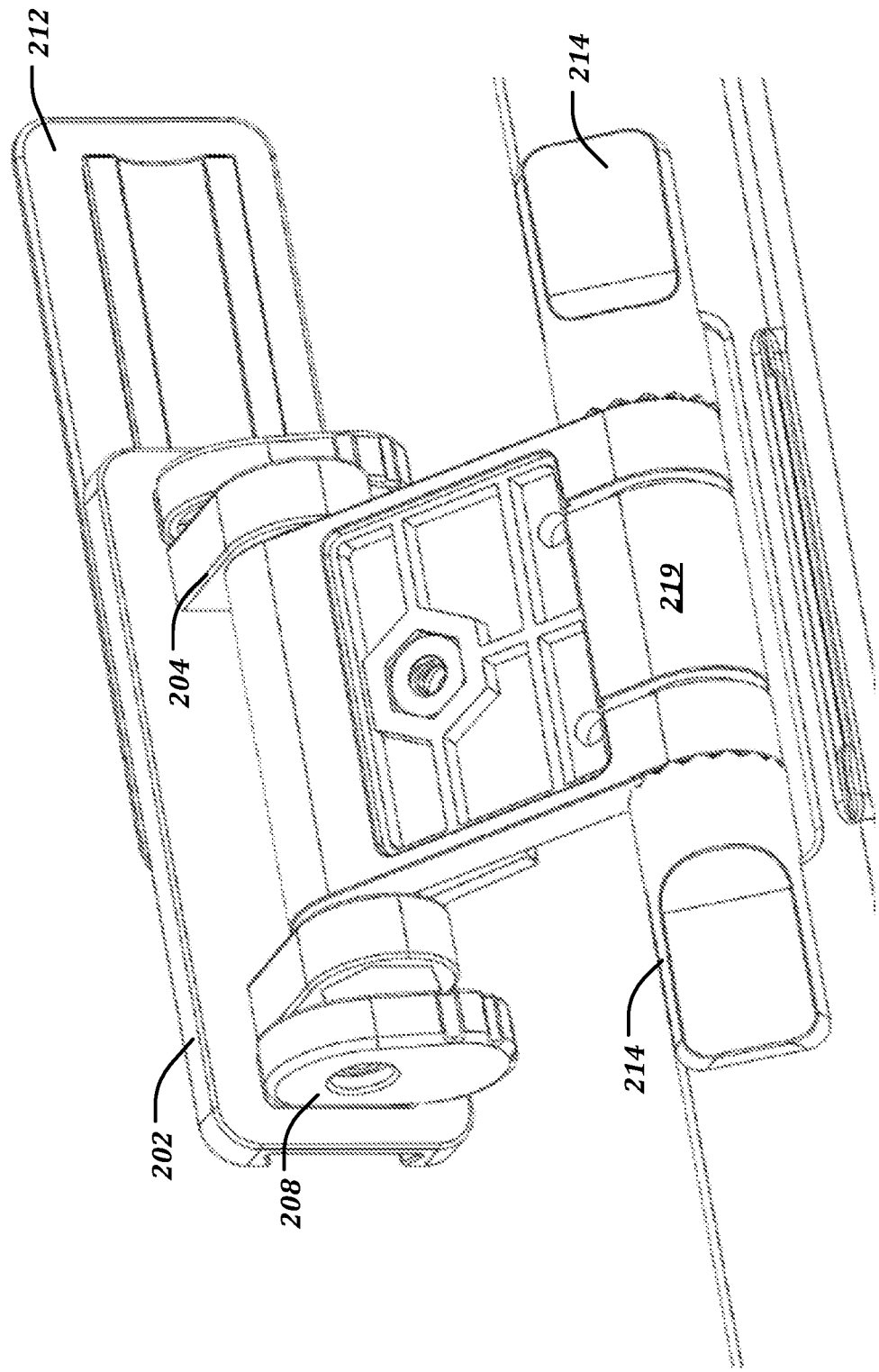
FIGS. 4A-4C show depictions of a base plate and articulating bracket of a visor system in accordance with an embodiment of the present invention.
Figure 4B:
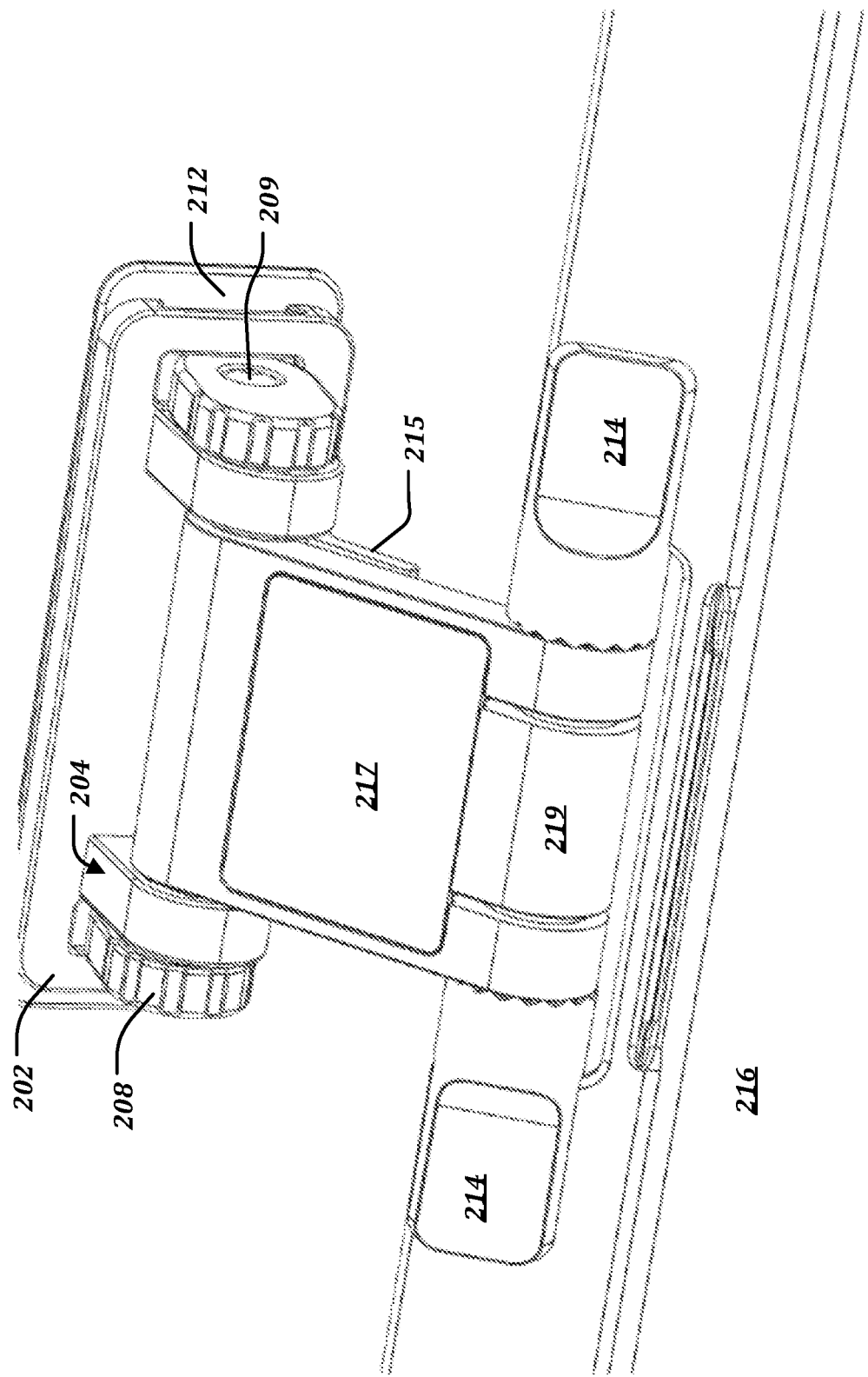
Figure 4C:
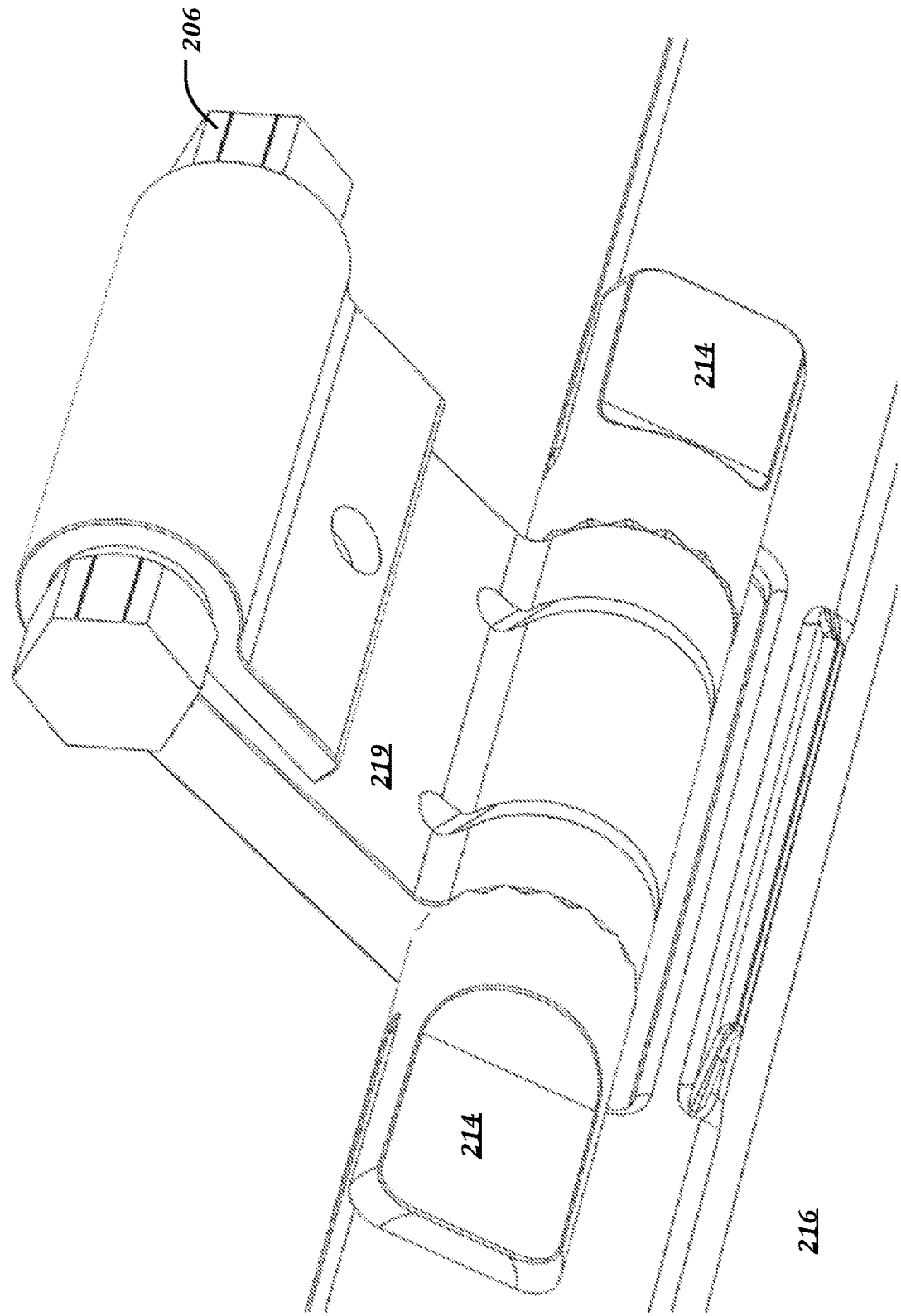
Figure 5A:
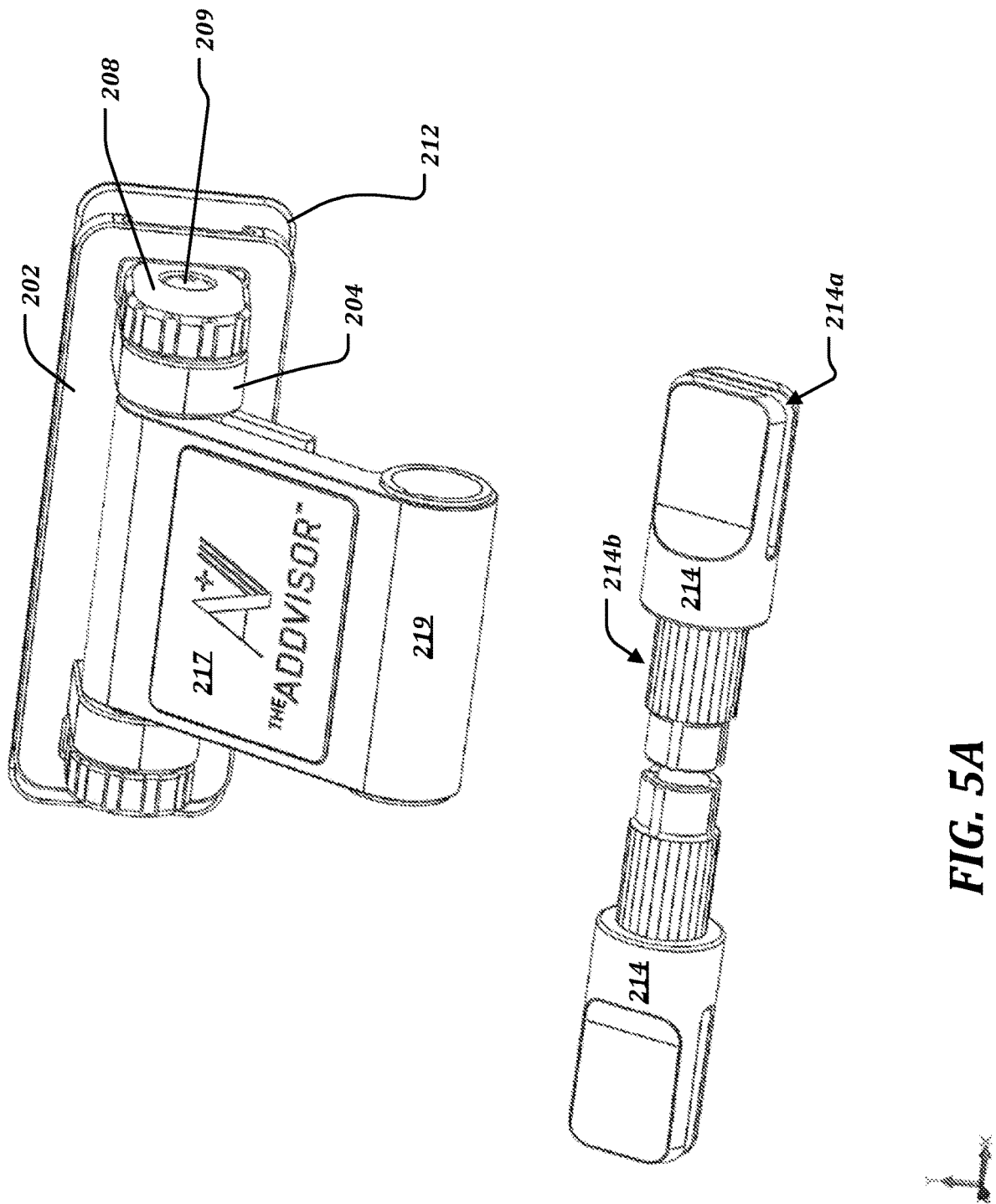
FIGS. 5A-5B show depictions of a base plate and articulating bracket in accordance with an embodiment of the present invention.
Figure 5B:
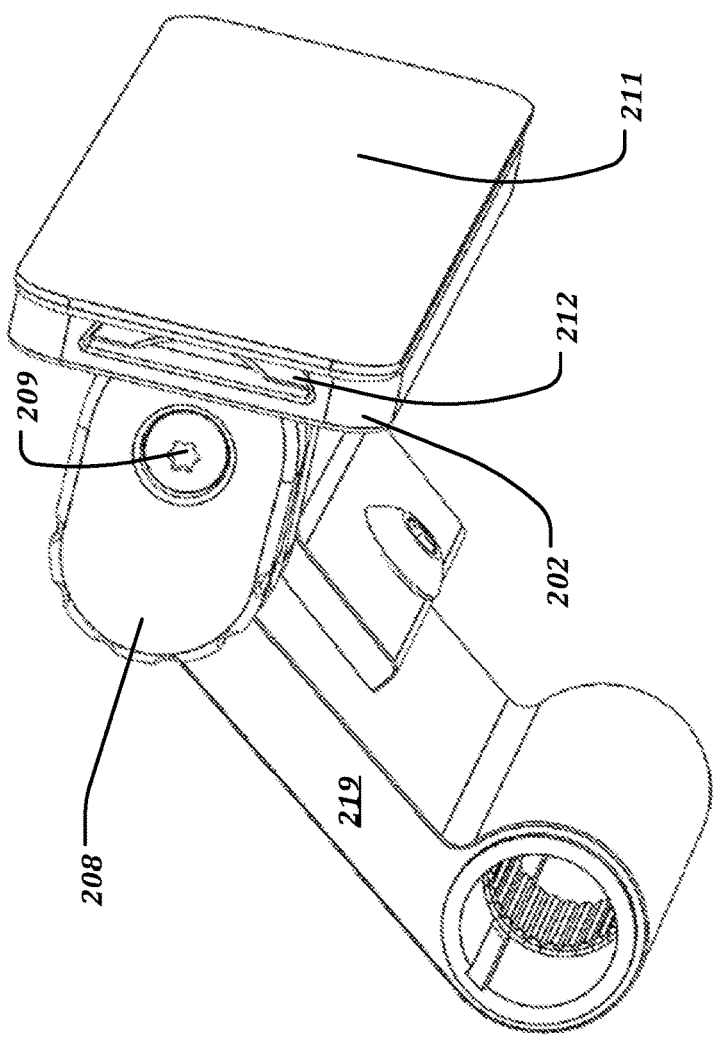
Figure 5B:
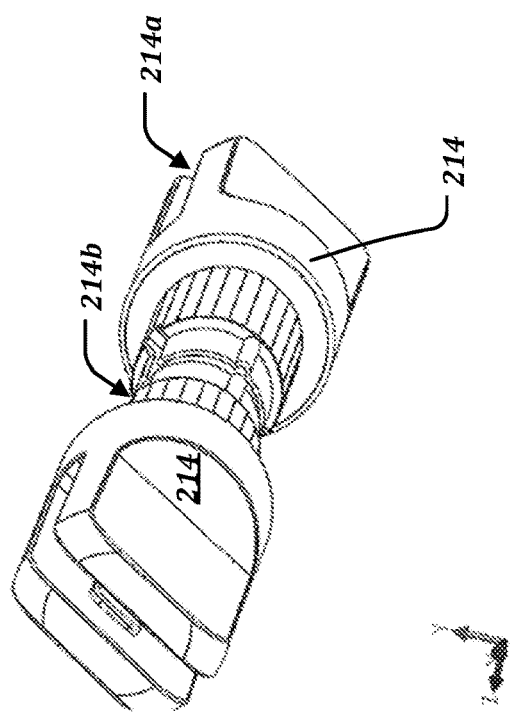
Figure 6A:
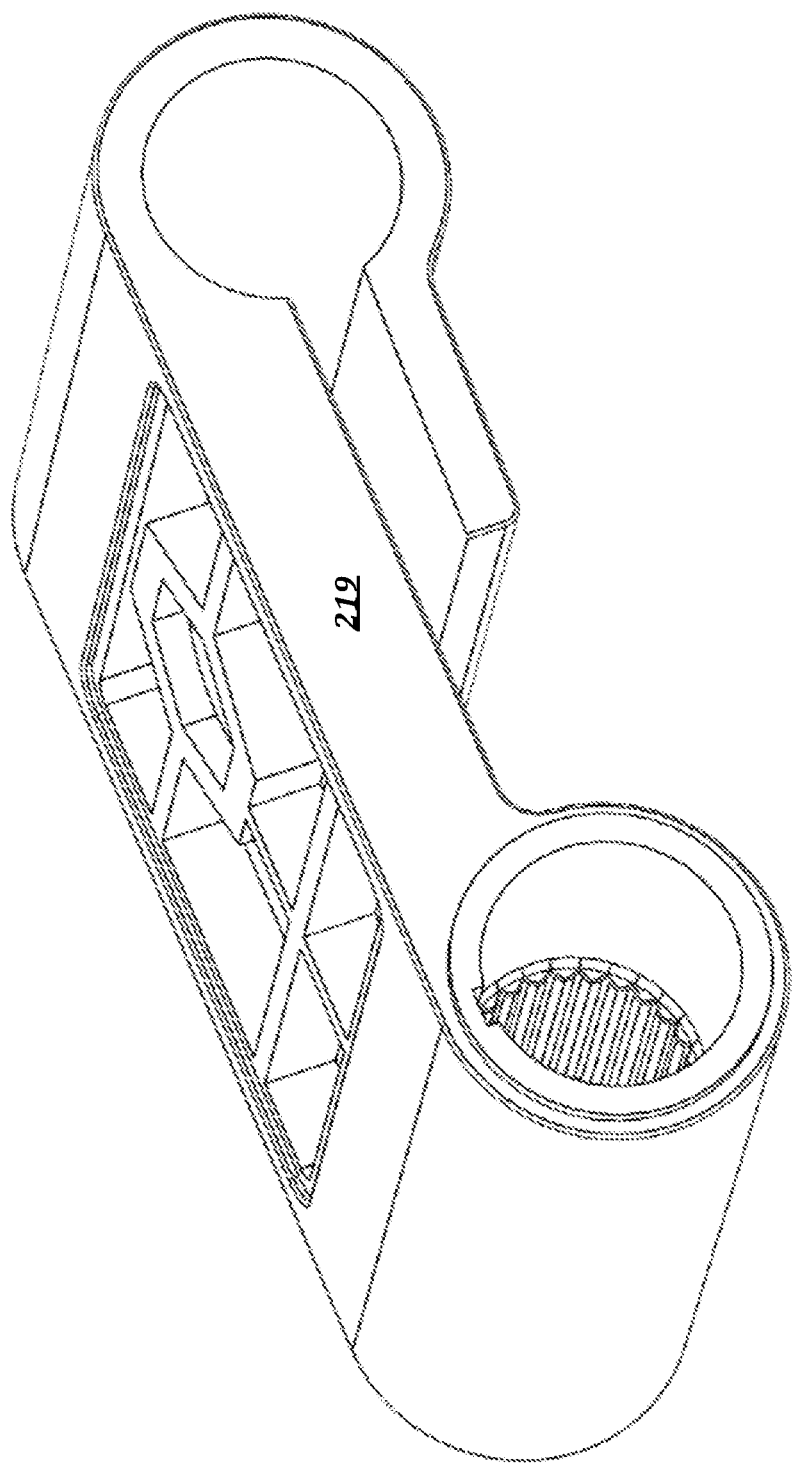
FIG. 6A shows a depiction of a hinge body in accordance with an embodiment of the present invention.
Figure 6B:
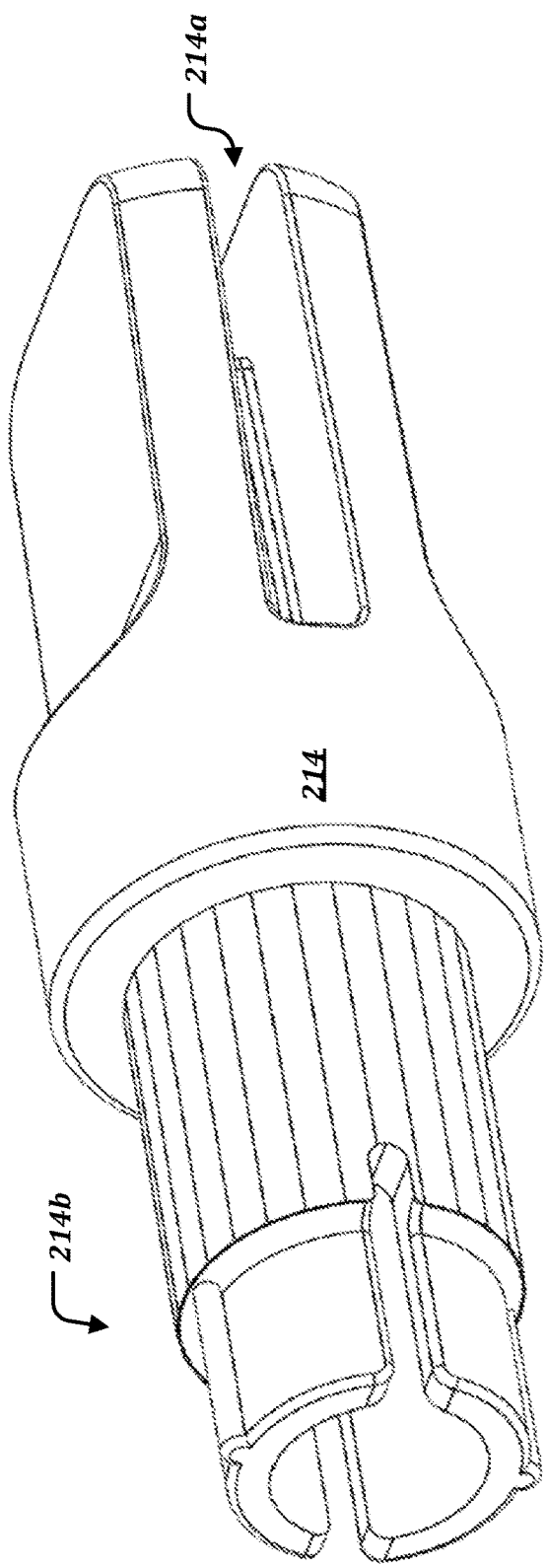
FIG. 6B shows a depiction of an accessory connector in accordance with an embodiment of the present invention.

As shown in FIGS. 4A-4C, hinge body 219 may include hinge body cover 217, and hinge body 219 may be further configured to rotatably connect to bracket base using hinge member 206 at first mounting axis located at a first end of hinge body; and auxiliary visor panel 216 (or some other accessory) is configured to rotatably connect to hinge body 219 using main accessory connectors 214 at a second positioning axis located at the opposed second end of hinge body. The second channel of hinge body comprises first and second openings, each opening configured to couple with one main accessory connector 214. As shown in FIGS. 5A-6B, hinge body 219 may comprises a first channel corresponding to first mounting axis and configured to receive hinge member 206, and wherein the hinge member is configured to rotate about the first mounting axis; and a second channel corresponding to a second positioning axis and configured to couple main accessory connectors 214. Main accessory connector 214 comprises a clamping portion 214a at a first end and a coupling portion 214b at a second end. Clamping portion may configured for securing a portion of an auxiliary visor panel (or another accessory) to the clamping portion, and may include a slot configured for receiving and securing a portion of an auxiliary visor panel (or other accessory) within the slot. Coupling portion comprises a shaft configured to couple with the hinge body by inserting into the second channel of the hinge body. Shaft may further include a recessed portion at an outer end and an elevated portion positioned at an inner location from the recessed portion. Recessed portion may comprise a plurality of detents, while a corresponding surface of an inner portion of the hinge body channel also comprises a plurality of detents; and wherein the recessed portion detents are configured to interact with the hinge body channel detents to maintain main accessory connector 214 at a fixed position. Recessed portion of main accessory connector 214 may further comprises one or more relief cuts configured to allow the recessed portion detents to flex against the detents inside of the hinge body channel. A surface of an outer portion of the second channel of hinge body may include one or more keyway grooves corresponding to locations and quantity of detents on the recessed portion of main accessory connector shaft. The recessed portion detents on the shaft and keyway grooves are configured to cooperate to guide insertion of the shaft into the hinge body channel according to a predetermined orientation.

Figure 7:
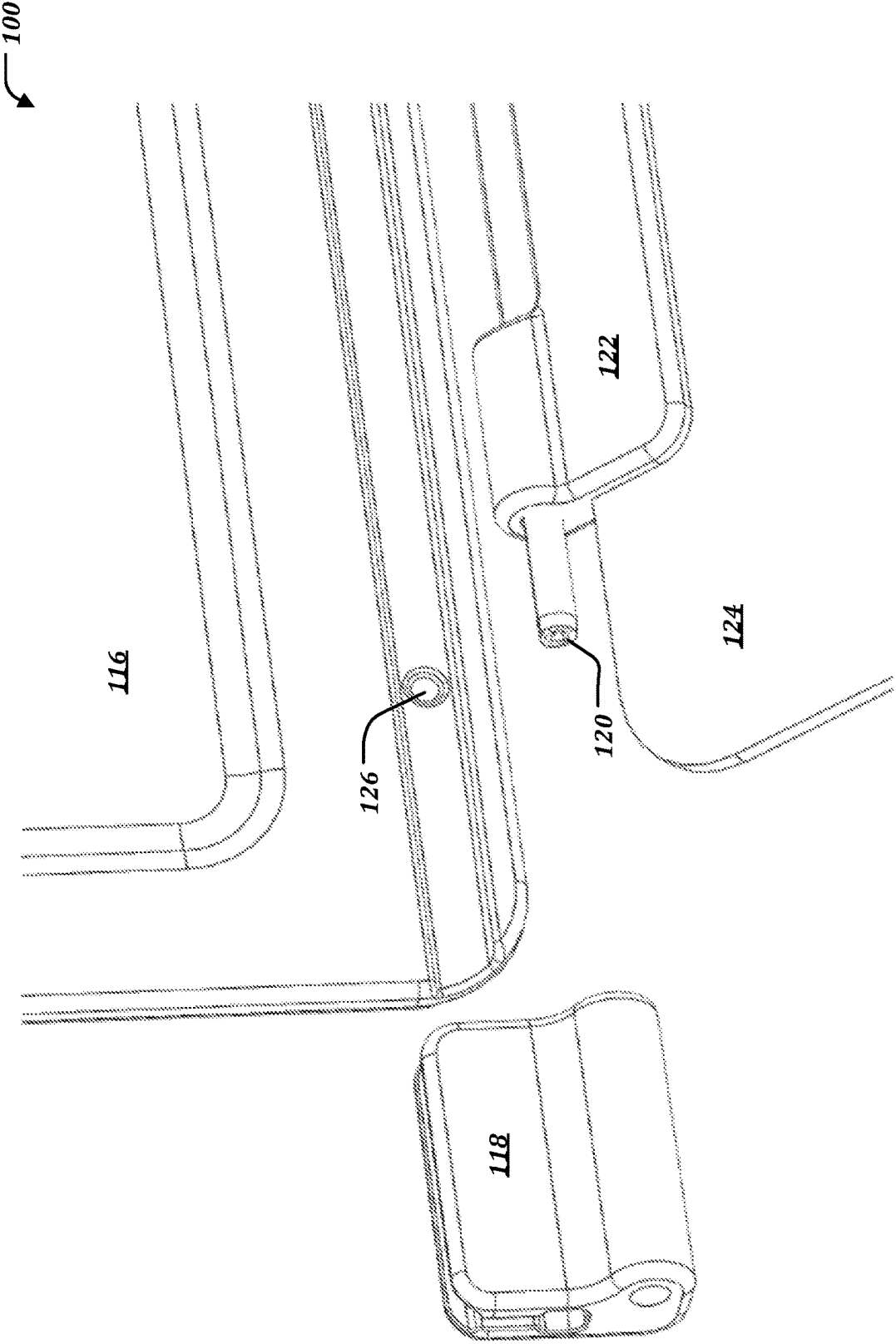
FIG. 7 shows a depiction of an accessory connector and auxiliary panels of a visor system in accordance with an embodiment of the present invention.
Figure 8:
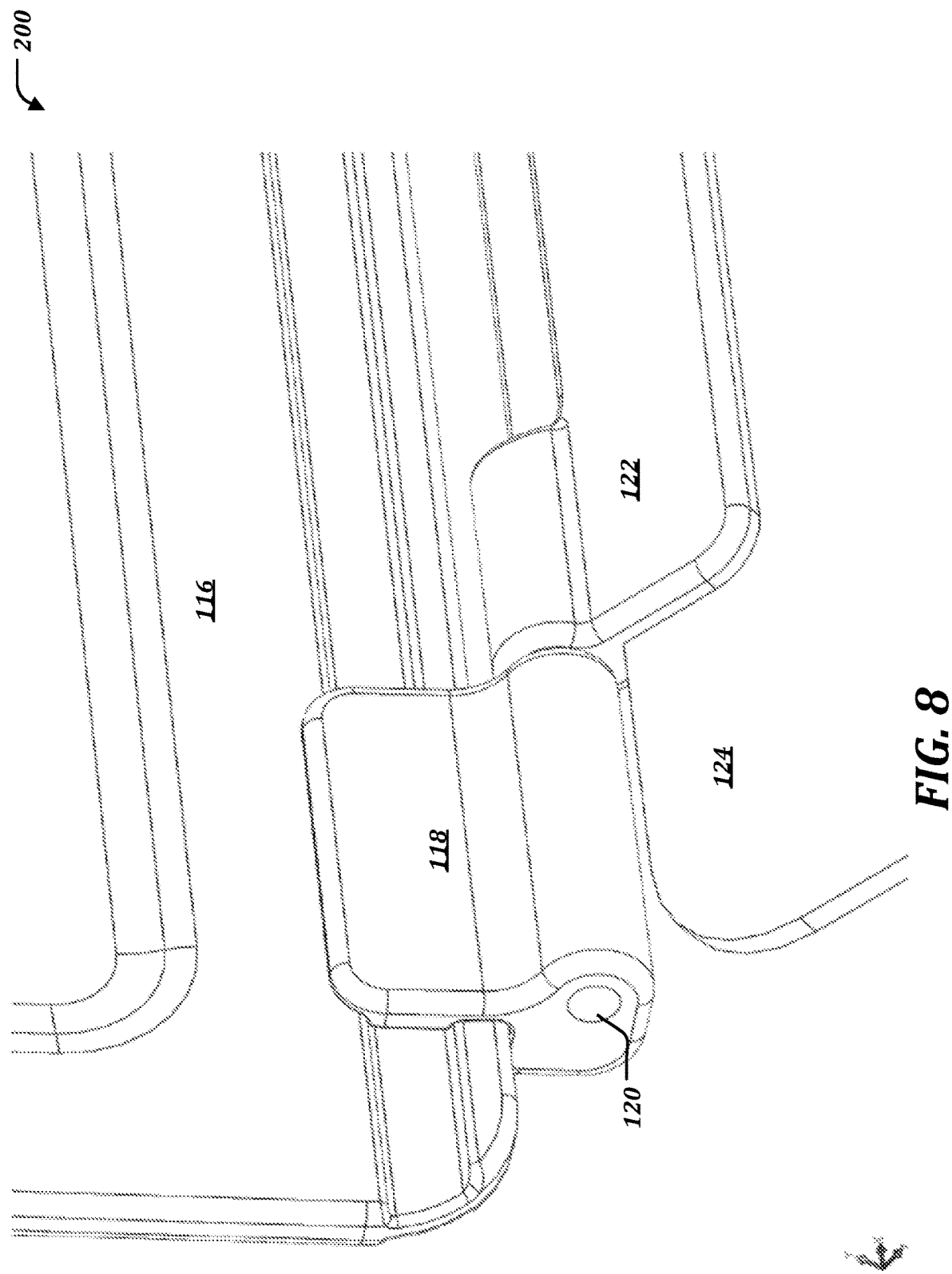
FIG. 8 shows a depiction of an accessory connector and auxiliary panels of a visor system in accordance with an embodiment of the present invention.
Figure 9:
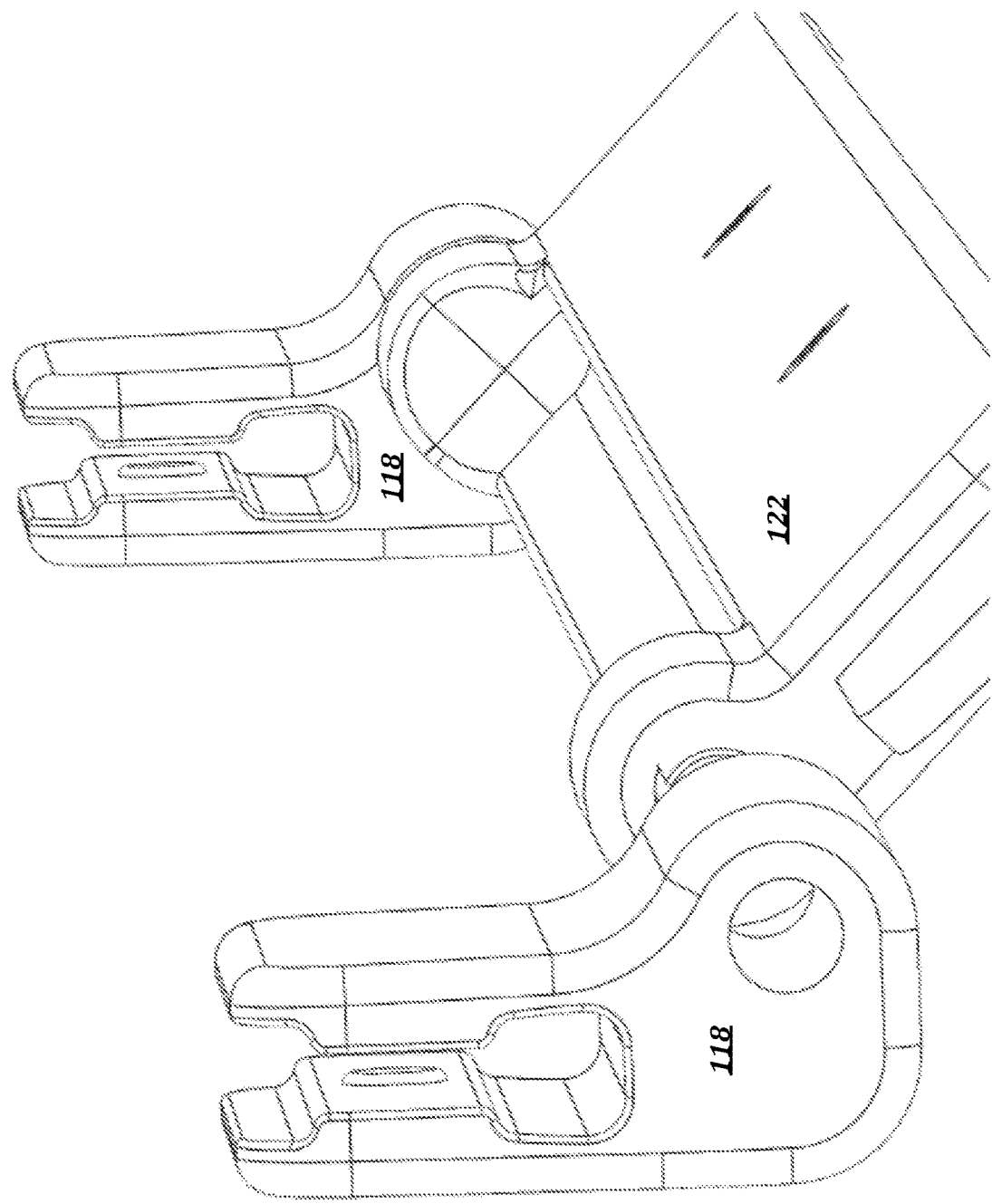
FIG. 9 shows a depiction of an accessory connector for auxiliary panels in accordance with an embodiment of the present invention.

FIGS. 7-9 show additional views and auxiliary visor panel 116, glare shield 124, and different connectors employed in system 100. As shown in FIGS. 7-9, auxiliary visor panel 116 and glare shield 124 may be movably connected to one another using visor accessory connector 118 and shield accessory connector 122. Visor accessory connector 118 and shield accessory connector 122 each may comprise a clamping portion in the form of a slot configured for receiving and securing a portion of auxiliary visor panel or glare shield (or other accessory) within the slot, and a coupling portion in the form of a channel configured to couple with another accessory connector using accessory hinge pin 120 or the like. In various embodiments, accessory connectors may be configured to couple by inserting accessory hinge pin 120 in corresponding, coaxial channels of adjacent accessory connectors. In some embodiments, auxiliary visor panel or glare shield (or other accessory) may be secured to an accessory connector using a fastener, such as glare shield 124 being secured to shield accessory connector 122 using screw 126.

D. Accessory Device and System Operation and Methods for Making and Using

Figure 10:
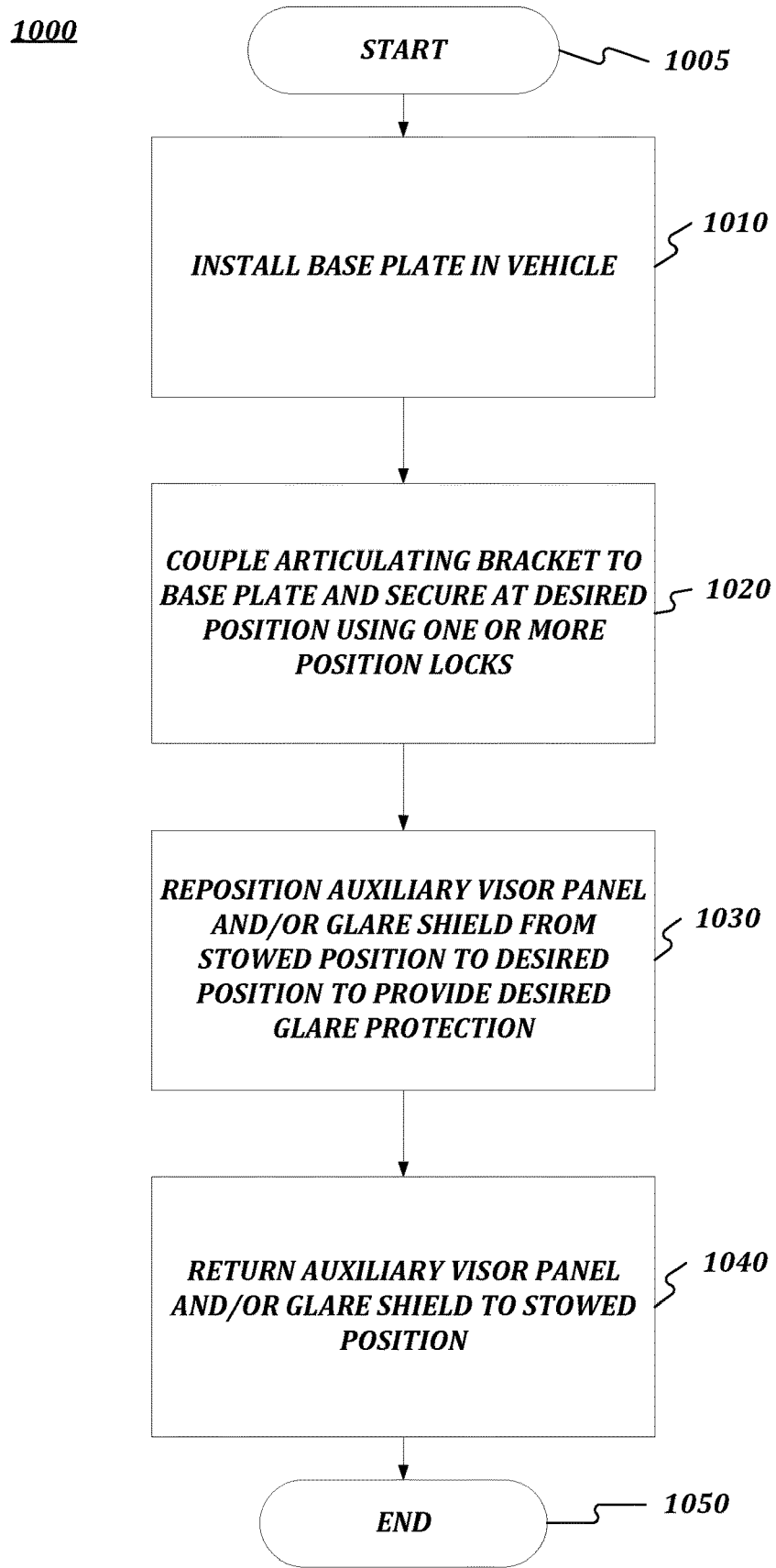
FIG. 10 shows a method for providing glare protection using a disclosed visor system in accordance with an embodiment of the present disclosure.

As described herein, also disclosed are various methods of using the disclosed devices and systems. For example, in another exemplary aspect, the present disclosure provides a method for using a disclosed system in a vehicle to provide glare protection. FIG. 10 is a flow chart setting forth the general stages involved in a method 1000 consistent with an embodiment of the disclosure for operating the disclosed devices and systems. Method 1000 may be implemented using, at least in part, system 100 or 200 as described in more detail below with respect to FIGS. 1A-9. Furthermore, although stages are disclosed with reference to system 100 or 200, it should be understood that a plurality of other components may enable the operation of method 1000, including, but not limited to, other device mechanisms, mechanical components, environment properties (e.g., vehicle location and surface), user conditions, and the like. Further still, although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein.

Method 1000 may begin at starting block 1005 and proceed to stage 1010, where the base plate may be secured to a site of a vehicle. By way of non-limiting example, the user may determine where to install the base plate (i.e., the center of the windshield between the left edge and the rear-view mirror), clean the installation area (i.e., windshield), and attach the base plate, for example, by using adhesive backing 111 on the base plate 112. From stage 1010, where the base plate is installed in the vehicle, method 1000 may proceed to stage 1020 where the articulating bracket may be coupled to the base plate and secured to the base plate at a desired position using one or more position locks. The coupling orientation and operation of device components, though disclosed in a particular order for illustrative purposes, may occur in other arrangements. For example, the position locks may be rotated to unlocked position such that the articulating bracket can be slid onto the base plate and positioned for best sun glare blocking. The position locks can them be rotated to the locked position to secure the articulating bracket in place. In further aspects, an advantage of the invention can be that it allows a user to couple the articulating bracket in a first orientation where the glare shield is facing down or couple the articulating bracket in a second orientation where the glare shield is facing down by rotating the articulating bracket 180 degrees. As described herein, each coupling method provides various operational functionalities and positional cooperativities with OEM vehicle parts, such as the OEM visor.

From stage 1020, where the articulating bracket has been secured to the base plate, method 1000 may proceed to stage 1030, where the user may then reposition the auxiliary visor and/or glare shield from a stowed away position to a number of other positions depending on the desired glare protection. By way of non-limiting example, from the stowed away position, the auxiliary visor may be rotated forward against the windshield to block forward glare, such as high glare. In further aspects, from the stowed away position, just the translucent glare shield can be rotated down to provide a maximum viewing area through which the user can view the driving environment. In still further aspects, from the stowed away position, the auxiliary visor may be rotated forward against the windshield and the translucent glare shield connected to the auxiliary visor can be rotated against the windshield too. Both the auxiliary visor and glare shield may be moved back from the windshield, such as to block lower glare. In various further aspects, the present system can cooperate with OEM visors to provide glare protection in multiple directions. From the stowed away position, the auxiliary visor may be rotated forward against the windshield to block forward glare and the OEM car visor can be rotated to the side to block side glare. In this configuration, it is unlikely for the user will to need to flip or move any visors while driving for distraction free driving. In still further aspects, the translucent glare shield connected to the auxiliary visor can also be rotated against the windshield. For example, the system can be deployed in a many configurations to provide multi directional glare protection to prevent flipping the OEM car visor back and forth when driving. Additional deployment configurations include one or more of: blocking front sun glare by flipping down the solid auxiliary visor; positioning the OEM car visor to the window to block side glare; using the glare shield, which may optionally be tinted and/or polarized, directly in your line of sight like sunglasses; using both the glare shield and the solid auxiliary visor together fully extended when the sun is low in the sky or reflecting off snow or water; and combinations thereof.

From stage 1030, where the device is used to provide glare protection, method 1000 may proceed to stage 1040, where the user returns the auxiliary visor and glare shield can be returned to the stowed away position. After stage 1040, method 1000 may end at stage 1050. In further aspects, a user may follow various steps of method 1000 to move articulating bracket between vehicles by uncoupling the articulating bracket from a first base plate installed in a first care and coupling the articulating bracket to a second base plate installed in a second vehicle.

The present invention includes at least the following aspects:

Aspect 1: A vehicle visor system, the system comprising:
an articulating bracket configured to releasably secured to a portion of a vehicle, and
at least one auxiliary visor panel releasably connected to the articulating bracket.

Aspect 2: A vehicle accessory system, the system comprising:
an articulating bracket configured to releasably secured to a portion of a vehicle; and
at least one accessory connected to the articulating bracket.

Aspect 3: A vehicle accessory connection system comprising:
an articulating bracket configured to be releasably secured to the vehicle, the articulating bracket configured to connect with at least one vehicle accessory.

Aspect 4: A vehicle accessory system, the system comprising:
a base plate assembly comprising a base plate and an articulating bracket, the base plate configured to be fixedly secured to a portion of a vehicle and the articulating bracket configured to be detachably couple with the base plate for securing to the vehicle, articulating bracket configured to be secured at a plurality of locations along the base plate; and
at least one auxiliary visor panel or accessory connected to the base plate assembly.

Aspect 5: A vehicle visor system, the system comprising:
a base plate assembly comprising a base plate and an articulating bracket, the base plate configured to be fixedly secured to a portion of a vehicle and the articulating bracket configured to be detachably couple with the base plate for securing to the vehicle, articulating bracket configured to be secured at a plurality of locations along the base plate; and
at least one auxiliary visor panel connected to the base plate assembly.

Aspect 6: A vehicle accessory connection system comprising:
a base plate assembly comprising a base plate and an articulating bracket, the base plate configured to be fixedly secured to a portion of a vehicle and the articulating bracket configured to be releasably secured to the vehicle using the base plate at a plurality of locations along the base plate; and
wherein the articulating bracket is configured to connect with at least one auxiliary visor panel or vehicle accessory.

Aspect 7: A vehicle accessory connection system comprising:
a base plate;
an articulating bracket, the base plate configured to be fixedly secured to a portion of a vehicle and the articulating bracket configured to be releasably secured to the vehicle using the base plate at a plurality of locations along the base plate; and
wherein the articulating bracket is configured to connect with at least one vehicle accessory.

Aspect 8: The system of aspect 1, 2, or 3, further comprising a base plate configured to be fixedly secured to a portion of a vehicle, wherein the articulating bracket configured to be detachably coupled with the base plate for securing to the vehicle, the articulating bracket configured to be secured at a plurality of locations along the base plate.

Aspect 9: The system of any preceding aspect, wherein the articulating bracket is configured to interchangeably connect with a plurality of auxiliary visor panels and/or vehicle accessories.

Aspect 10: The system of any preceding aspect, wherein the articulating bracket comprises a bracket base, a hinge body, and at least one hinge member or mechanism configured to pivotably connect the bracket base and hinge body at a first pivot axis or connection axis.

Aspect 11: The system of any preceding aspect, wherein the articulating bracket comprises a second hinge member or mechanism configured to pivotably connect the hinge body and a visor panel or vehicle accessory at a second pivot axis or connection axis.

Aspect 12: The system of any preceding aspect, wherein the articulating bracket comprises a bracket base, a hinge body, a first hinge member configured to pivotably connect the bracket base and hinge body at a first pivot axis or connection axis, and a second hinge member configured to pivotably connect the hinge body and a visor panel or vehicle accessory at a second pivot axis or connection axis.

Aspect 13: The system of any preceding aspect, wherein the auxiliary visor panel is configured to releasably connect to the articulating bracket at a second pivot axis or connection axis.

Aspect 14: The system of any preceding aspect, wherein the bracket base is configured to connect at a first pivot axis of the articulating bracket; and wherein an auxiliary visor panel or other vehicle accessory is configured to connect to the articulating bracket at a second pivot axis.

Aspect 15: The system of any preceding aspect, wherein the bracket base is configured to connect at a first connection axis of the articulating bracket; and wherein an auxiliary visor panel or other accessory is configured to connect to the articulating bracket at a second connection axis.

Aspect 16: The system of any preceding aspect, wherein the bracket base is configured to connect at a first pivot axis of the articulating bracket using a first hinge mechanism; and wherein an auxiliary visor panel or other vehicle accessory is configured to connect to the articulating bracket at a second pivot axis using a second hinge mechanism.

Aspect 17: The system of any preceding aspect, wherein the hinge body comprises first and second opposed ends, said hinge body being configured to rotatably connect to the bracket base at a first pivot axis located at a first end of the hinge body; and wherein an auxiliary visor panel or other accessory is configured to rotatably connect to the hinge body at a second pivot axis located at an opposed second end of the hinge body.

Aspect 18: The system of any preceding aspect, wherein the hinge body is configured to rotatably connect to the bracket base at a first connection axis located at a first end of the hinge body; and wherein an auxiliary visor panel or other accessory is configured to connect to the hinge body at a second connection axis located at an opposed second end of the hinge body.

Aspect 19: The system of any preceding aspect, wherein the first end of the hinge body comprises a mount hinge mechanism configured to rotatably connect to the bracket base; and wherein the opposed second end of the hinge body comprises a position hinge mechanism configured to connect to and position an auxiliary visor panel or other accessory.

Aspect 20: The system of any preceding aspect, wherein the bracket base comprises one or more bracket posts, each bracket post configured to secure an end of the hinge member.

Aspect 21: The system of any preceding aspect, wherein each bracket post and hinge body end comprise an aperture dimensioned and shaped to receive and secure an end of the hinge member.

Aspect 22: The system of any preceding aspect, wherein the articulating bracket is releasably secured to the base plate in a fixed position using at least one securing component or securing means.

Aspect 23: The system of any preceding aspect, wherein the bracket base is releasably secured to the base plate in a fixed position using at least one securing means or securing component.

Aspect 24: The system of any preceding aspect, wherein the bracket base comprises a groove and the base plate comprises a tongue, and wherein the bracket base groove and base plate tongue cooperate to releasably secure the base plate assembly and/or bracket base in a fixed position using at least one securing component.

Aspect 25: The system of any preceding aspect, wherein the bracket base comprises a groove and the base plate comprises a tongue, and wherein the bracket base groove and base plate tongue cooperate to releasably secure the bracket base against the base plate in a fixed position using at least one securing component.

Aspect 26: The system of any preceding aspect, wherein the bracket base groove, base plate tongue, and the securing component cooperate to releasably secure the base plate assembly in a fixed position.

Aspect 27: The system of any preceding aspect, wherein the bracket base groove, base plate tongue, and the securing component cooperate to releasably secure the bracket base to the base plate in a fixed position.

Aspect 28: The system of any preceding aspect, wherein the base plate tongue comprises a recessed portion, groove or slot; and wherein the securing component is configured to cooperate with the recessed portion or slot to releasably secure the bracket base to the base plate in a fixed position.

Aspect 29: The system of any preceding aspect, wherein the top portion of the base plate tongue comprises a recessed portion, groove or slot; and wherein the securing component is configured to cooperate with the recessed portion or slot to releasably secure the base plate assembly in a fixed position.

Aspect 30: The system of any preceding aspect, wherein the base plate tongue comprises a recessed portion or slot; and wherein the securing component is configured to extend through an opening within the bracket base to cooperate with the recessed portion or slot to releasably secure the bracket base to the base plate in a fixed position.

Aspect 31: The system of any preceding aspect, wherein the base plate tongue comprises a recessed portion or slot; and wherein the securing component is configured to extend through an opening within the bracket base to cooperate with the recessed portion or slot to releasably secure the base plate assembly in a fixed position.

Aspect 32: The system of any preceding aspect, wherein the base plate assembly and/or bracket base comprise a locked state and an unlocked state.

Aspect 33: The system of any preceding aspect, wherein in the locked state, the base plate assembly and/or bracket base is secured to the base plate in a fixed position.

Aspect 34: The system of any preceding aspect, wherein in the unlocked state, the base plate assembly and/or bracket base is configured to travel along the base plate to a plurality of positions.

Aspect 35: The system of any preceding aspect, wherein in the unlocked state, the base plate assembly and/or bracket base is configured to move laterally along the base plate to a plurality of positions.

Aspect 36: The system of any preceding aspect, wherein the least one securing means or securing component comprises a plurality of securing means or securing components.

Aspect 37: The system of any preceding aspect, wherein the at least one securing means or securing component is rotatably connected to at least one bracket post.

Aspect 38: The system of any preceding aspect, wherein a first securing means or securing component is axially connected to a first bracket post.

Aspect 39: The system of any preceding aspect, wherein a second securing means or securing component is axially connected to a second opposed end of a first hinge member.

Aspect 40: The system of any preceding aspect, wherein a connection axis of the least one securing means or securing component is offset with an axis of the at least one hinge member; and wherein the securing component connection axis and hinge member axis are coplanar along a horizontal plane orthogonal to the base plate.

Aspect 41: The system of any preceding aspect, wherein a first securing means or securing component is coaxial connected to a first end of a first hinge member, and a second securing means or securing component is coaxial connected to a second opposed end of the first hinge member.

Aspect 42: The system of any preceding aspect, wherein the securing means or securing component is connected using a fastener or the like.

Aspect 43: The system of any preceding aspect, wherein the securing means or securing component is connected to the bracket base and/or bracket post and/or at least one hinge member using a fastener or the like.

Aspect 44: The system of any preceding aspect, wherein the securing means or securing component is comprises a position lock or the like.

Aspect 45: The system of any preceding aspect, wherein an auxiliary visor panel or other accessory is pivotably connected to the base plate assembly at a second pivot or connection axis.

Aspect 46: The system of any preceding aspect, wherein an auxiliary visor panel or other accessory is pivotably connected to the base plate assembly or articulating bracket using an accessory connector, accessory coupling, connecting component, or other connecting means.

Aspect 47: The system of any preceding aspect, wherein the auxiliary visor panel or other accessory is pivotably connected to the base plate assembly using a coupling, hinge or joint, or the like.

Aspect 48: The system of any preceding aspect, wherein the hinge body comprises a first connection axis and a second connection axis.

Aspect 49: The system of any preceding aspect, wherein the hinge body comprises a first channel corresponding to a first connection axis and configured to receive the hinge member.

Aspect 50: The system of any preceding aspect, wherein the hinge member is configured to rotate about the first connection axis.

Aspect 51: The system of any preceding aspect, wherein the hinge body comprises a second channel corresponding to a second connection axis and configured to couple with at least one accessory connector.

Aspect 52: The system of any preceding aspect, wherein the second channel of the hinge body comprise a first opening and a second opening, each opening configured to couple with one accessory connector.

Aspect 53: The system of any preceding aspect, wherein the at least one accessory connector is configured to rotate about the second connection axis.

Aspect 54: The system of any preceding aspect, wherein the at least one accessory connector comprises a clip, coupling, clamp, hinge member, or a combination thereof.

Aspect 55: The system of any preceding aspect, wherein the at least one accessory connector comprises a clamping portion at a first end and a coupling portion at a second end.

Aspect 56: The system of any preceding aspect, wherein the clamping portion is configured for securing a portion of an auxiliary visor panel or other accessory to the clamping portion.

Aspect 57: The system of any preceding aspect, wherein the clamping portion comprises a slot configured for receiving and securing a portion of an auxiliary visor panel or other accessory within the slot.

Aspect 58: The system of any preceding aspect, wherein the coupling portion is configured to couple with the hinge body, the articulating bracket, another accessory connector, or a combination thereof.

Aspect 59: The system of any preceding aspect, wherein the coupling portion comprises a shaft, member, damper or protrusion configured to couple with the hinge body by inserting into a hinge body channel and/or accessory connecter.

Aspect 60: The system of any preceding aspect, wherein the coupling portion comprises a shaft, damper or protrusion configured to couple with the hinge body by inserting into the second channel of the hinge body.

Aspect 61: The system of any preceding aspect, wherein each bracket post comprises a plurality of grooves on an inner surface for receiving and retaining therein one or more ball plungers or pegs extending from the hinge body.

Aspect 62: The system of any preceding aspect, wherein the plurality of grooves is configured to releasably retain one or more ball plungers or pegs for selectively securing the first end of the hinge body at a predetermined position along a first rotational axis.

Aspect 63: The system of any preceding aspect, wherein each accessory connector comprises a plurality of grooves on an inner surface for receiving and retaining therein one or more ball plungers or pegs extending from the hinge body.

Aspect 64: The system of any preceding aspect, wherein the plurality of grooves of the accessory connector is configured to releasably retain one or more ball plungers or pegs for selectively securing the second end of the hinge body at a predetermined position along a second rotational axis.

Aspect 65: The system of any preceding aspect, wherein the shaft or protrusion comprises a recessed portion at an outer end and an elevated portion positioned at an inner location from the recessed portion.

Aspect 66: The system of any preceding aspect, wherein the recessed portion comprises a plurality of detents; wherein a corresponding surface of an inner portion of the hinge body channel comprises a plurality of detents; and wherein the recessed portion detents are configured to interact with the hinge body channel detents to maintain the accessory connector at a fixed position.

Aspect 67: The system of any preceding aspect, wherein the recessed portion comprises one or more relief cuts configured to allow the recessed portion detents to flex against the detents inside of the hinge body channel.

Aspect 68: The system of any preceding aspect, wherein a surface of an outer portion of the hinge body channel comprises keyway grooves corresponding to locations and quantity of detents on the recessed portion; and wherein the recessed portion detents and keyway grooves are configured to cooperate to guide insertion of the shaft or protrusion into the hinge body channel according to a predetermined orientation.

Aspect 69: The system of any preceding aspect, wherein the elevated portion comprises a plurality of detents; and wherein the elevated portion detents are configured to cooperate with the keyway grooves in maintaining the accessory connector at a fixed position.

Aspect 70: The system of any preceding aspect, wherein the coupling portion comprises a channel configured to couple with another accessory connector using a hinge member; wherein the accessory connectors are coupled by inserting the hinge member in corresponding, coaxial channels of adjacent accessory connectors.
Aspect 71: The system of any preceding aspect, wherein the hinge member comprises a mount axle, mount pin, or the like.
Aspect 72: The system of any preceding aspect, further comprising a glare shield movably connected to the auxiliary visor panel.
Aspect 73: The system of any preceding aspect, wherein the glare shield is movably connected to the auxiliary visor panel using an accessory connector.
Aspect 74: The system of any preceding aspect, wherein the auxiliary accessory comprises at least one of: a flat rectangular fan, Heads-Up-Projector (HUD), dash camera, back up camera display, auxiliary rear view mirror for expanding viewable area, or a combination thereof, or the like.
Aspect 75: The system of any preceding aspect, further comprising a glare shield movably connected to the auxiliary visor panel.
Aspect 76: The system of any preceding aspect, wherein the glare shield is movably connected to the auxiliary visor panel using an accessory connector.
Aspect 77: The system of any preceding aspect, wherein the auxiliary accessory comprises at least one of: a flat rectangular fan, Heads-Up-Projector (HUD), dash camera, back up camera display, auxiliary rear view mirror for expanding viewable area, or a combination thereof, or the like.
Aspect 78: The system of any preceding aspect, further comprising a plurality of base plates or brackets.
Aspect 79: The system of any preceding aspect, further comprising a plurality of auxiliary visor panels.
Aspect 80: The system of any preceding aspect, wherein the base plate is releasably secured using a securing means.
Aspect 81: The system of any preceding aspect, wherein the base plate is releasably secured to a vehicle visor or roof.
Aspect 82: The system of any preceding aspect, wherein the base plate is releasably secured using a securing means.
Aspect 83: The system of any preceding aspect, wherein the base plate comprises at least one aperture for receiving the securing means.
Aspect 84: The system of any preceding aspect, wherein the base plate comprises a plurality of apertures for receiving the securing means.
Aspect 85: The system of any preceding aspect, wherein the base plate is releasably secured to a vehicle visor or roof.
Aspect 86: The system of any preceding aspect, wherein the base plate comprises a triangular shape, and is configured to be secured to a corner of the vehicle visor.
Aspect 87: The system of any preceding aspect, wherein the base plate comprises a plurality of securing means.
Aspect 88: The system of any preceding aspect, wherein the auxiliary visor panel is pivotably connected using a connecting means.
Aspect 89: The system of any preceding aspect, wherein the auxiliary visor panel further comprises a securing means configured to releasably secure a portion of the auxiliary visor panel to a vehicle visor or roof.
Aspect 90: The system of any preceding aspect, wherein the auxiliary visor panel is pivotably connected using a pivot ball joint, or the like.
Aspect 91: The system of any preceding aspect, wherein the pivot ball joint comprises a pivot ball with a pin extending therefrom, a socket for receiving said ball, and a cover plate for securing the pivot ball in the socket.
Aspect 92: The system of any preceding aspect, wherein the pivot ball joint comprises a pivot ball with a pin extending therefrom, a magnetic socket for receiving said ball, and a retaining means for securing the pivot ball in the socket.
Aspect 93: The system of any preceding aspect, wherein the pivot ball pin comprises a mounting portion configured to connect with the auxiliary panel.
Aspect 94: The system of any preceding aspect, wherein the cover plate comprises at least one guide slot configured to receive the pin and control the motion of the auxiliary visor panel.
Aspect 95: The system of any preceding aspect, wherein the cover plate comprises a plurality of guide slots configured to control the motion of the auxiliary visor panel.
Aspect 96: The system of any preceding aspect, wherein the cover plate is configured to allow the auxiliary visor panel to move to a predetermined position.
Aspect 97: The system of any preceding aspect, wherein the pivot ball joint comprises a retaining means configured to hold the auxiliary visor panel in a predetermined position.
Aspect 98: The system of any preceding aspect, wherein the retaining means is configured to hold the auxiliary visor panel in a plurality of predetermined positions.
Aspect 99: The system of any preceding aspect, wherein the cover plate is configured to allow the auxiliary visor panel to move to a plurality of predetermined positions.
Aspect 100: The system of any preceding aspect, wherein the cover plate is configured to allow the auxiliary visor panel to move from a first predetermined position to a second predetermined position or a third predetermined position.
Aspect 101: The system of any preceding aspect, wherein the retaining means is in operative communication with the socket and configured to control the motion of the auxiliary visor panel.
Aspect 102: The system of any preceding aspect, wherein the retaining means is configured to control the motion of the ball.
Aspect 103: The system of any preceding aspect, wherein the retaining means is further configured to allow the auxiliary visor panel to move to a predetermined position.
Aspect 104: The system of any preceding aspect, wherein the retaining means is further configured to hold the auxiliary visor panel in a predetermined position.
Aspect 105: The system of any preceding aspect, wherein the retaining means is configured to allow the auxiliary visor panel to move to a plurality of predetermined positions.
Aspect 106: The system of any preceding aspect, wherein the retaining means is configured to allow the auxiliary visor panel to move from a first predetermined position to a second predetermined position or a third predetermined position.
Aspect 107: The system of any preceding aspect, wherein the predetermined position comprises a stowed position against the vehicle visor, a side window position, or an extended position against the windshield.
Aspect 108: The system of any preceding aspect, further comprising first and second auxiliary visor panels.
Aspect 109: The system of any preceding aspect, wherein the first auxiliary visor panel is rotatably connected to at least a portion of the base plate or second auxiliary visor panel, or a combination thereof.
Aspect 110: The system of any preceding aspect, wherein the second auxiliary visor panel is rotatably connected to at least a portion of the base plate or the first auxiliary visor panel, or a combination thereof.

Aspect 111: The system of any preceding aspect, wherein the first auxiliary visor panel is rotatably connected to at least a portion of the base plate, and the second auxiliary visor panel is rotatably connected to a different portion of the first auxiliary visor panel.

Aspect 112: The system of any preceding aspect, wherein the first or second auxiliary visor panels are rotatably connected to an edge of the base plate or second auxiliary visor panel, or a combination thereof.

Aspect 113: The system of any preceding aspect, wherein the base plate is rotatably connected to a first edge of the first auxiliary visor panel, and the second auxiliary visor panel is rotatably connected to a different edge of the first auxiliary visor panel.

Aspect 114: The system of any preceding aspect, wherein the second auxiliary visor panel is nestably connected to the first auxiliary visor panel.

Aspect 115: The system of any preceding aspect, wherein the auxiliary visor panel comprises at least one edge configured to releasably couple with at least one of: at least one other auxiliary visor panel edge, or base plate edge, or combinations thereof.

Aspect 116: The system of any preceding aspect, wherein the first auxiliary visor panel comprises at least one edge configured to releasably couple with at least one of: at least one other auxiliary visor panel edge, or base plate edge, or combinations thereof.

Aspect 117: The system of any preceding aspect, wherein the second auxiliary visor panel comprises at least one edge configured to releasably couple with at least one of: at least one other auxiliary visor panel edge, or base plate edge, or combinations thereof.

Aspect 118: The system of any preceding aspect, wherein the second auxiliary visor panel comprises at least one edge configured to releasably couple with a first auxiliary visor panel edge and a base plate edge.

Aspect 119: The system of any preceding aspect, wherein the second auxiliary visor panel comprises a first edge configured to releasably couple with a first auxiliary visor panel edge and a second edge configured to releasably couple with a base plate edge.

Aspect 120: The system of any preceding aspect, wherein the first auxiliary visor panel comprises at least one edge that define a cavity for receiving at least a portion of the second auxiliary visor panel.

Aspect 121: The system of any preceding aspect, wherein the base plate comprises a plurality of thickness.

Aspect 122: The system of any preceding aspect, wherein the base plate comprises first and second surfaces.

Aspect 123: The system of any preceding aspect, wherein at least one surface of the base plate comprises an elevation portion and a recessed portion.

Aspect 124: The system of any preceding aspect, wherein the recessed portion is configured to nestably receive at least a portion of the first auxiliary visor panel.

Aspect 125: The system of any preceding aspect, wherein the elevated portion of the base plate and the cavity of the first auxiliary visor panel form a substantially planar surface when in a nesting position.

Aspect 126: The system of any preceding aspect, wherein an edge of the elevated portion of the base plate and complimentary edge of the surface the cavity of the first auxiliary visor panel have an 'S' or crescent shape.

Aspect 127: The system of any preceding aspect, wherein the auxiliary visor panel is rotatably connected to at least a portion of the base bracket, and the glare shield is rotatably connected to a different portion of the auxiliary visor panel.

Aspect 128: The system of any preceding aspect, wherein the base bracket is rotatably connected to a first edge of the auxiliary visor panel, and the glare shield is pivotably connected to a different edge of the auxiliary visor panel.

Aspect 129: The system of any preceding aspect, wherein the glare shield is nestably connected to the auxiliary visor panel.

Aspect 130: The system of any preceding aspect, wherein the auxiliary visor panel comprises at least one edge configured to releasably couple with at least one of: vehicle visor, base bracket edge, or combinations thereof.

Aspect 131: The system of any preceding aspect, further comprising at least one storage compartment.

Aspect 132: The system of any preceding aspect, wherein the storage compartment comprises a slot or cavity configured to releasably secure pens, cards, or a combination thereof.

Aspect 133: The system of any preceding aspect, wherein the retaining means comprises a friction fitting, snap ring, O-ring, pressure fitting, magnetic fitting, clip, clasp, and the like.

Aspect 134: The system of any preceding aspect, wherein the snap ring or O-ring can be retained within a groove to accommodate the snap ring or O-ring.

Aspect 135: The system of any preceding aspect, wherein auxiliary visor panel comprises a cavity or void for receiving the glare shield.

Aspect 136: The system of any preceding aspect, wherein the glare shield is slidably connected to the auxiliary visor panel.

Aspect 137: The system of any preceding aspect, wherein the glare shield is pivotably connected to the auxiliary visor panel.

Aspect 138: The system of any preceding aspect, wherein the glare shield is connected using a connecting means.

Aspect 139: The system of any preceding aspect, wherein the glare shield is configured to extend from the auxiliary visor panel to reduce glare or bright light when the auxiliary visor panel is a raised position.

Aspect 140: The system of any preceding aspect, wherein the securing means comprises a clip, clamp, latch, bracket, snap, fitting, clasp, Velcro, strap, tie wraps, hook and latch fastener, loop and tie fastener, cable, elastic, band, button and buttonholes, or combinations thereof.

Aspect 141: The system of any preceding aspect, wherein the connecting means comprises a hinge or similar connecting mechanism.

Aspect 142: The system of any preceding aspect, wherein the system can comprise a button or other release mechanism configured to release the auxiliary panel and/or glare shield from a secured position.

Aspect 143: The system of any preceding aspect, wherein the base plate can comprise a plurality of securing or connecting means, such as, and without limitation, Velcro at one portion and a clamping mechanism on another portion of the base plate.

Aspect 144: The system of any preceding aspect, wherein the base plate can comprise a securing means for releasably securing the auxiliary visor panel to the base plate.

Aspect 145: The system of any preceding aspect, wherein the base plate can have a rectangular, oval, round, or cylindrical shape.

Aspect 146: The system of any preceding aspect, wherein the glare shield is comprised of an UV-reducing and/or glare-reducing material, or a combination thereof.

Aspect 147: The system of any preceding aspect, wherein the glare shield is comprised of an opaque, micro-louver, transparent, tinted, translucent, polarized, phototropic, electrochromic, fabric, cloth, plastic, woven or non-woven, natural or synthetic material, or combinations thereof.

Aspect 148: The system of any preceding aspect, wherein the glare shield comprises a tinted acrylic panel.

Aspect 149: The system of any preceding aspect, wherein the auxiliary visor panel is pivotally mounted to a vehicle visor such that it can pivot downwardly and away from the primary visor without encroaching in the user's space when the vehicle visor is in the side window position.

Aspect 150: The system of any preceding aspect, wherein the base plate comprises a triangular shape, and is configured to be secured to a corner of the vehicle visor.

Aspect 151: The system of any preceding aspect, wherein at least one securing means is configured to be secured to first portion of the vehicle visor, and at least one other securing means is configured to be secured to a second portion of the vehicle visor.

Aspect 152: The system of any preceding aspect, wherein the at least other securing means comprises a magnet and corresponding magnetic element.

Aspect 153: The system of any preceding aspect, wherein the magnet is disposed within the auxiliary panel.

Aspect 154: The system of any preceding aspect, wherein the auxiliary visor panel further comprises a securing means configured to releasably secure a portion of the auxiliary visor panel to third portion of the vehicle visor.

Aspect 155: The system of any preceding aspect, wherein system components are releasably coupled using a coupling means.

Aspect 156: The system of any preceding aspect, wherein the coupling means comprise friction fitting, snap ring, O-ring, pressure fitting, clip, clasp, and the like.

Aspect 157: The system of any preceding aspect, wherein the coupling means is configured to hold a system component in place until a user moves the system component to a different position.

Aspect 158: The system of any preceding aspect, wherein the base plate comprises a socket for receiving the pivot ball.

Aspect 159: The system of any preceding aspect, wherein the socket for receiving the pivot ball is attached to a portion of the vehicle.

Aspect 160: The system of any preceding aspect, wherein the socket for receiving the pivot ball is attached to a portion of the vehicle roof or vehicle visor.

Aspect 161: The system of any preceding aspect, wherein the base plate or base bracket is an OEM vehicle part, and the at least one auxiliary visor panel is configured to be attached by inserting the pivot ball in the socket.

Aspect 162: The system of any preceding aspect, wherein the base plate is an OEM vehicle visor comprising a socket for receiving the pivot ball, and the at least one auxiliary visor panel is configured to be attached by inserting the pivot ball in the socket.

Aspect 163: The system of any preceding aspect, wherein the retaining means comprises an adjustment knob having at least one of a clamping arm and clamping face.

Aspect 164: The system of any preceding aspect, wherein the adjustment knob is configured to control the motion of the auxiliary visor panel by adjusting the adjustment knob towards and away from the pivot ball.

Aspect 165: The system of any preceding aspect, wherein the adjustment knob is configured to prevent motion of the auxiliary visor panel by screwing the adjustment knob towards the pivot ball.

Aspect 166: The system of any preceding aspect, wherein the adjustment knob is configured to allow motion of the auxiliary visor panel by screwing the adjustment knob away from the pivot ball.

Aspect 167: The system of any preceding aspect, wherein the adjustment knob is configured to control the motion of the auxiliary visor panel by tightening the clamping face of the adjustment knob against the pivot ball.

Aspect 168: The system of any preceding aspect, wherein the adjustment knob is configured to prevent movement of the auxiliary visor panel by tightening the clamping face of the adjustment knob against the pivot ball.

Aspect 169: The system of any preceding aspect, wherein the adjustment knob is configured to fix the auxiliary visor panel position by tightening the clamping face of the adjustment knob against the pivot ball.

Aspect 170: The system of any preceding aspect, wherein the clamping face of the adjustment knob has an arcuate shape substantially matching the shape of the pivot ball.

Aspect 171: The system of any preceding aspect, wherein the base plate comprises at least two apertures for receiving a securing means, the apertures being contained within a base plate edge; and the securing means having first and second opposed ends, the first end of the securing means being detachably connected to the base plate by extending through a first aperture from a first side of the base plate to a second side of the base plate, and by extending through a second aperture from the second side of the base plate to the first side of the plate.

Aspect 172: The system of any preceding aspect, wherein a first side of the base plate is configured to be secured against a surface of an OEM visor.

Aspect 173: The system of any preceding aspect, wherein a first side of the base plate comprises a gripping portion.

Aspect 174: The system of any preceding aspect, wherein a second side of the base plate comprises a pivot ball joint.

Aspect 175: The system of any preceding aspect, further comprising an extendable member, the extendable member having first and second opposed ends.

Aspect 176: The system of any preceding aspect, wherein the extendable member is connected to the auxiliary panel at a first end.

Aspect 177: The system of any preceding aspect, wherein the extendable member comprises an extension rod.

Aspect 178: The system of any preceding aspect, wherein the extendable member is connected to the auxiliary panel at a first end and comprises an extension rod at a second end.

Aspect 179: The system of any preceding aspect, wherein the extendable member comprises a flexible portion at a first end and a rigid portion at a second end.

Aspect 180: The system of any preceding aspect, wherein the extension rod is configured to telescope from within the extendable member.

Aspect 181: The system of any preceding aspect, wherein at least a portion of the extendable member is configured to be releasably secured to an OEM visor retention device or clip.

Aspect 182: The system of any preceding aspect, wherein the auxiliary panel comprises at least one of: at least one internal housing and at least one outer casing.

Aspect 183: The system of any preceding aspect, wherein the auxiliary panel comprises at least one internal housing and at least one outer casing.

Aspect 184: The system of any preceding aspect, wherein the internal housing comprises a first housing panel and a second housing panel.

Aspect 185: The system of any preceding aspect, wherein the base bracket comprises at least one securing means configured to be secured to first portion of a vehicle visor; and wherein the auxiliary panel comprises at least one securing means configured to be secured to a second portion of a vehicle visor.

Aspect 186: The system of any preceding aspect, wherein the at least one securing means of the auxiliary panel comprises a magnet and corresponding magnetic element, the magnet being configured to magnetically couple with the corresponding magnetic element.

Aspect 187: The system of any preceding aspect, wherein at least a portion of the auxiliary securing mean is disposed within the auxiliary panel.

Aspect 188: The system of any preceding aspect, wherein the magnet is disposed within the auxiliary panel.

Aspect 189: The system of any preceding aspect, wherein the magnet is disposed within the internal housing of the auxiliary panel.

Aspect 190: The system of any preceding aspect, wherein the magnet is disposed within the internal housing of the auxiliary panel and the magnetic element is disposed on a surface of or with a vehicle visor.

Aspect 191: The system of any preceding aspect, wherein the magnetic element is a metal plate.

Aspect 192: The system of any preceding aspect, wherein the auxiliary visor panel contains a telescoping visor extension configured to lateral extend out from within the auxiliary visor panel.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein can be different from the actual publication dates, which can require independent confirmation.

The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A vehicle visor system, the system comprising:
an auxiliary visor panel or vehicle accessory;
an articulating bracket configured to be releasably secured to a portion of a vehicle, the articulating bracket comprising a bracket base including a groove and a hinge body, the hinge body being configured to movably connect the bracket base and the auxiliary visor panel or vehicle accessory; and
a base plate comprising a tongue and configured to be fixedly secured to the portion of the vehicle, wherein the articulating bracket is configured to be coupled with the base plate for securing to the vehicle;
wherein the bracket base is configured to move laterally along the base plate; and
wherein the bracket base groove and base plate tongue cooperate to releasably secure
the bracket base to the base plate at a plurality of positions.

2. The system of claim 1, wherein the system is mechanically and operationally independent of an OEM car visor; and wherein the system is effective to allow the auxiliary visor panel to be positioned below, above, and laterally adjacent to the OEM car visor.

3. The system of claim 1, wherein the vehicle accessory comprises one or more of: a flat rectangular fan, a Heads-Up-Projector (HUD), a camera, a back up camera display, or an auxiliary rearview mirror for expanding viewable area.

4. The system of claim 1, wherein a top portion of the base plate tongue comprises a recessed portion; and wherein at least one securing component is configured to cooperate with the recessed portion to releasably secure the bracket base.

5. The system of claim 4, wherein the at least one securing component is configured to extend through an opening within the bracket base to cooperate with the recessed portion to releasably secure the bracket base to the base plate.

6. The system of claim 5, wherein the at least one securing component comprises a plurality of securing components, wherein the bracket base is configured to be secured when only one securing component is positioned over the base plate tongue and any remaining securing components are unable to engage the base plate tongue.

7. The system of claim 1, further comprising a glare shield movably connected to an edge of the auxiliary visor panel.

8. The system of claim 1, wherein a first end of the hinge body is configured to pivotably connect with the bracket base at a first pivot axis, and a second end of the hinge body is configured to pivotably connect with the auxiliary visor panel at a second pivot axis.

9. The system of claim 8, further comprising a first mechanism configured to pivotably connect the bracket base and the first end of the hinge body at the first pivot axis, and a second mechanism configured to pivotably connect the second end of the hinge body and the auxiliary visor panel at the second pivot axis.

10. The system of claim 9, wherein the bracket base comprises one or more bracket posts, each bracket post configured to secure an end of a hinge member, and wherein each bracket post and corresponding hinge body end comprise an aperture dimensioned and shaped to receive and secure an end of the hinge member.

11. A vehicle accessory system, the system comprising:
a vehicle accessory configured for attachment in a vehicle;

a base plate assembly comprising a base plate configured to be fixedly secured to a portion of the vehicle, and an articulating bracket configured to be coupled with the base plate for securing to the vehicle;

the articulating bracket comprising:
- a bracket base configured to be releasably secured to the base plate in a fixed position,
- a hinge body,
- a first hinge member configured to rotatably connect the bracket base and a first end of the hinge body at a first connection axis, and
- a second hinge member configured to movably connect an opposed second end of the hinge body with the vehicle accessory at a second connection axis; and wherein the bracket base is configured to move laterally along the base plate.

12. The system of claim 11, wherein the bracket base comprises a groove and the base plate comprises a tongue; wherein the bracket base groove and the base plate tongue cooperate to releasably secure the bracket base to the base plate at a plurality of positions using at least one securing component.

13. The system of claim 12, wherein a top portion of the base plate tongue comprises a recessed portion; and wherein the at least one securing component is configured to cooperate with the recessed portion of the base plate tongue to releasably secure the bracket base to the base plate.

14. The system of claim 13, wherein the at least one securing component is configured to extend through an opening within the bracket base to cooperate with the recessed portion to releasably secure the bracket base to the base plate; and wherein each securing component is rotatably connected to a bracket post.

15. The system of claim 11, wherein the bracket base comprises a plurality of bracket posts, each bracket post being configured to secure an end of a hinge member to the bracket base, and wherein each hinge member end comprises an aperture dimensioned and shaped to receive the bracket post, thereby securing the end of the hinge member to the bracket post.

16. The system of claim 11, wherein the second end of the hinge body is configured to interchangeably connect with a plurality of vehicle accessories.

17. The system of claim 11, wherein the vehicle accessory comprises one or more of: a flat rectangular fan, a Heads-Up-Projector (HUD), a camera, a back up camera display, or an auxiliary rearview mirror for expanding viewable area.

18. A vehicle visor system, the system comprising:
an auxiliary visor panel;
an articulating bracket configured to be releasably secured to a portion of a vehicle, the articulating bracket comprising a bracket base and a hinge body, a first end of the hinge body being configured to pivotably connect to the bracket base at a first pivot axis using a first hinge mechanism, and a second end of the hinge body configured to pivotably connect with the auxiliary visor panel at a second pivot axis using a second hinge mechanism, and
a base plate configured to be fixedly secured to the portion of the vehicle, wherein the articulating bracket is configured to be detachably coupled with the base plate for securing to the vehicle, the articulating bracket configured to be secured at a plurality of locations by moving laterally along the base plate.

19. The system of claim 18, wherein the bracket base comprises a groove and the base plate comprises a tongue, and wherein the bracket base groove and base plate tongue cooperate to releasably secure the bracket base to the base plate at a plurality of positions using at least one securing component; and
wherein a top portion of the base plate tongue comprises a recessed portion; and
wherein the at least one securing component is configured to cooperate with the recessed portion to releasably secure the bracket base; and wherein the at least one securing component is configured to extend through an opening within the bracket base to cooperate with the recessed portion to releasably secure the bracket base to the base plate.

20. The system of claim 18, wherein the system is mechanically and operationally independent of an OEM car visor; and wherein the system is effective to allow the auxiliary visor panel to be positioned below, above, and laterally adjacent to the OEM car visor.

* * * * *